United States Patent
Zhong et al.

(10) Patent No.: US 12,216,360 B2
(45) Date of Patent: Feb. 4, 2025

(54) DISPLAY MODULE, DISPLAY APPARATUS AND DISPLAY METHOD THEREFOR

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuan Zhong, Beijing (CN); Jiaxing Wang, Beijing (CN); Hongliang Yuan, Beijing (CN); Xiaojuan Wu, Beijing (CN); Jian Wang, Beijing (CN); Hongsheng Bi, Beijing (CN); Zhiqiang Zhao, Beijing (CN); Ziqi Sun, Beijing (CN); Yongzhong Zhang, Beijing (CN); Feng Qu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/292,304

(22) PCT Filed: Jul. 1, 2022

(86) PCT No.: PCT/CN2022/103364
§ 371 (c)(1),
(2) Date: Jan. 25, 2024

(87) PCT Pub. No.: WO2023/005601
PCT Pub. Date: Feb. 2, 2023

(65) Prior Publication Data
US 2024/0369881 A1    Nov. 7, 2024

(30) Foreign Application Priority Data
Jul. 30, 2021  (CN) .......................... 202110872036.9

(51) Int. Cl.
*G02F 1/1337* (2006.01)
*G02F 1/1333* (2006.01)
(Continued)

(52) U.S. Cl.
CPC ...... *G02F 1/1337* (2013.01); *G02F 1/133371* (2013.01); *G02F 1/13363* (2013.01);
(Continued)

(58) Field of Classification Search
CPC ........... G02F 1/133371; G02F 2203/09; G02F 1/133638; G02F 2413/02; G02F 2413/04;
(Continued)

(56) References Cited

U.S. PATENT DOCUMENTS

2002/0041351 A1    4/2002  Baek
2003/0210365 A1*  11/2003  Koyama ............. G02F 1/13363
                                                                  349/113
(Continued)

FOREIGN PATENT DOCUMENTS

CN    1470911 A    1/2004
CN    1797129 A    7/2006
(Continued)

*Primary Examiner* — Jessica M Merlin
(74) *Attorney, Agent, or Firm* — Nath, Goldberg & Meyer; Joshua B. Goldberg

(57) ABSTRACT

A display module, including: a first substrate (1); a second substrate (2); a liquid crystal layer (3); the display module further includes a first polarizing film (4), a first one-half wave plate (51) and a first quarter wave plate (52); the first quarter wave plate (52), the first one-half wave plate (51) and the first polarizing film (4) are on a side of the first substrate (1) away from the liquid crystal layer (3) and are sequentially stacked in a direction away from the first substrate (1); an angle between an absorption axis of the first polarizing film (4) and a first direction is in a range of 85° to 105°; an angle between a slow axis of the first one-half (Continued)

wave plate (51) and the first direction is in a range of 105° to 125°.

20 Claims, 19 Drawing Sheets

(51) Int. Cl.
    *G02F 1/13363*     (2006.01)
    *G02F 1/1343*     (2006.01)
(52) U.S. Cl.
    CPC .. *G02F 1/133638* (2021.01); *G02F 1/134309* (2013.01); *G02F 2203/09* (2013.01)
(58) Field of Classification Search
    CPC ............. G02F 2413/06; G02F 2413/08; G02F 1/13363
    See application file for complete search history.

(56) References Cited

U.S. PATENT DOCUMENTS

| 2005/0264733 A1* | 12/2005 | Yang | G02F 1/13363 349/114 |
| 2008/0094555 A1 | 4/2008 | Wu et al. | |
| 2010/0225855 A1* | 9/2010 | Lu | G02F 1/133555 349/114 |

FOREIGN PATENT DOCUMENTS

| CN | 1924666 A | 3/2007 |
| CN | 1963631 A | 5/2007 |
| CN | 1979286 A | 6/2007 |
| CN | 101075026 A | 11/2007 |
| CN | 101344669 A | 1/2009 |
| CN | 216670451 U | 6/2022 |
| JP | 2004038064 A | 2/2004 |

* cited by examiner

FIG. 5

| Simulation condition | | | Absorption axis of PVA, 5°; λ/2, COP material, Re. 270nm, 25°; λ/4, COP material, Re. 110nm, 95° | | | | | | Absorption axis of PVA, 95°; λ/2, COP material, Re. 270nm, 115°; λ/4, COP material, Re. see the table, 0° | | | | |
|---|---|---|---|---|---|---|---|---|---|---|---|---|---|
| Second light conversion layer | First light conversion layer | | | | | | | | | | | | |
| | LC | Material/angle (°) | | | | | | | | | | | |
| | | Material/angle (°) | | | | | | | | | | | |
| | | λ/4 Re. (nm) | 120 | 136 | 138 | 140 | 146 | 150 | 154 | 158 | 160 | 164 | 168 | 170 |
| | | L.O. Re. (nm) | 302 | 302 | 302 | 302 | 302 | 302 | 302 | 302 | 302 | 302 | 302 | 302 |
| Simulation result | Reflectivity | | 40.2% | 40.2% | 40.2% | 40.2% | 40.0% | 39.9% | 39.8% | 39.5% | 39.4% | 39.2% | 38.8% | 38.7% |
| | Transmittance | | 98 | 222 | 319 | 494 | 3942 | 5501 | 5186 | 4942 | 4929 | 4834 | 3898 | 4235 |

FIG. 7

| Simulation condition | Second light | Angle for absorption axis of POL(°) | | | | | | | | | | | | | | | | | |
|---|---|---|---|---|---|---|---|---|---|---|---|---|---|---|---|---|---|---|---|
| | conversion layer | Angle for 1/2 CCP (°) | 0 | 10 | 20 | 23 | 24 | 25 | 26 | 27 | 28 | 30 | 40 | 60 | 80 | 140 | 160 | 170 | 180 |
| | | Angle for 1/4 CCP (°) | 40 | 60 | 80 | 86 | 88 | 90 | 92 | 94 | 96 | 100 | 120 | 140 | 160 | 180 | 0 | 20 | 40 |
| | LC | LC Re. (nm) | 147 | 147 | 147 | 147 | 147 | 147 | 147 | 147 | 147 | 147 | 147 | 147 | 147 | 147 | 147 | 147 | 147 |
| Simulation result | | Reflectivity | 37.2% | 37.3% | 36.6% | 36.9% | 36.9% | 37.0% | 37.1% | 37.1% | 37.2% | 37.4% | 36.2% | 37.0% | 34.0% | 32.6% | 34.4% | 37.1% | |
| | | CR | 5.0 | 11.7 | 78.9 | 272.3 | 446.0 | 619.8 | 551.3 | 360.8 | 223.7 | 102.3 | 16.9 | 7.6 | 4.8 | 4.0 | 4.4 | 6.0 | |

FIG. 9

| Simulation condition | Second light conversion layer | Material/angle (°) | Absorption axis of PVA, 5°, λ/2, COP material, Re: 270nm, 25°, λ/4, COP material, Re: see the table, 90° | | | | | | | | | | | | |
|---|---|---|---|---|---|---|---|---|---|---|---|---|---|---|---|
| | | λ/4 Re. (nm) | 80 | 85 | 90 | 95 | 100 | 105 | 110 | 113 | 115 | 120 | 130 | 140 |
| | LC | LC Re. (nm) | 147 | 147 | 147 | 147 | 147 | 147 | 147 | 147 | 147 | 147 | 147 | 147 |
| Simulation result | | Reflectivity | 29.6% | 30.9% | 32.7% | 33.8% | 35.2% | 36.0% | 37.0% | 37.2% | 37.5% | 37.9% | 38.0% | 37.2% |
| | | CR | 544.0 | 539.3 | 575.9 | 593.8 | 611.2 | 608.3 | 619.8 | 619.1 | 618.6 | 270.0 | 39.8 | 14.3 |

| | | | Material/angle (°) | Absorption axis of PVA, 5°; λ/2, COP material, Re. 270nm, 25°; λ/4, COP material, Re. 110nm, 90° | | | | | | Absorption axis of PVA, 95°; λ/2, COP material, Re. 270nm, 115°; λ/4, PC material, Re. 110nm, 0° | | | | |
|---|---|---|---|---|---|---|---|---|---|---|---|---|---|---|
| Simulation condition | Second light conversion layer | | | | | | | | | | | | | | |
| | First light conversion layer | | Angle for absorption axis of PVA | | | | | | | | | | | | |
| | LC | | LC Re. (nm) | 101 | 114 | 121 | 134 | 147 | 161 | 174 | 188 | 201 | 208 | 214 |
| Simulation result | Reflectivity | | | 22.2% | 27.7% | 30.2% | 34.3% | 37.0% | 38.0% | 37.4% | 35.1% | 31.4% | 29.1% | 26.7% |
| | CR | | | 372.8 | 464.7 | 505.6 | 569.7 | 619.8 | 636.4 | 626.0 | 589.1 | 499.1 | 402.1 | 302.3 |

FIG. 15

DISPLAY MODULE, DISPLAY APPARATUS AND DISPLAY METHOD THEREFOR

This is a National Phase Application filed under 35 U.S.C. 371 as a national stage of PCT/CN2022/103364, filed Jul. 1, 2022, an application claiming benefit of Chinese Application No. 202110872036.9, filed Jul. 30, 2021, the content of each of which is hereby incorporated by reference in its entirety.

TECHNICAL FIELD

The present disclosure relates to the field of display technology, and in particular to a display module, a display apparatus and a display method for the display apparatus.

BACKGROUND

In recent years, a transflective screen has more and more important applications in the fields of outdoor meters, high-end mobile phones, wearable displays and the like because the transflective screen has an excellent reading capability of a reflective screen in outdoor sunlight and an excellent reading capability of a fully-transparent screen in weak light and no light.

SUMMARY

Embodiments of the present disclosure provide a display module, a display apparatus and a display method for the display apparatus.

In a first aspect, the embodiments of the present disclosure provide a display module, including: a first substrate; a second substrate; a liquid crystal layer in a cell gap between the first substrate and the second substrate; wherein the display module further includes a first polarizing film, a first one-half wave plate and a first quarter wave plate; the first quarter wave plate, the first one-half wave plate and the first polarizing film are on a side of the first substrate away from the liquid crystal layer and are sequentially stacked in a direction away from the first substrate; the first substrate includes a transmissive region and a reflective region, and a thickness of the liquid crystal layer in the transmissive region is greater than a thickness of the liquid crystal layer in the reflective region; the transmissive region allows light incident from a side of the first substrate away from second substrate to pass through the transmissive region; the reflective region allows light incident from a side of the second substrate away from the first substrate to be reflected; an angle between an absorption axis of the first polarizing film and a first direction is in a range of 85° to 105°; an angle between a slow axis of the first one-half wave plate and the first direction is in a range of 105° to 125°; a retardation amount of light with wavelength of 550 nm by the first one-half wave plate is in a range of 260 nm to 280 nm; an angle between a slow axis of the first quarter wave plate and the first direction is in a range of −20° to 20°; a retardation amount of light with wavelength of 550 nm by the first quarter wave plate is in a range of 136 nm to 170 nm; and the first direction is a direction perpendicular to an initial alignment direction of the liquid crystal layer.

In some embodiments, the display module further includes a second polarizing film, a second one-half wave plate and a second quarter wave plate; wherein the second quarter wave plate, the second one-half wave plate and the second polarizing film are on a side of the second substrate away from the liquid crystal layer and are sequentially stacked in a direction away from the second substrate; an angle between an absorption axis of the second polarizing film and the first direction is in a range of 0° to 10°; an angle between a slow axis of the second one-half wave plate and the first direction is in a range of 20° to 30°; a retardation amount of light with wavelength of 550 nm by the second one-half wave plate is in a range of 260 nm to 280 nm; an angle between a slow axis of the second quarter wave plate and the first direction is in a range of 80° to 100°; and a retardation amount of light with wavelength of 550 nm by the second quarter wave plate is in a range of 80 nm to 115 nm.

In some embodiments, the angle between the absorption axis of the first polarizing film and the first direction is in a range of 90° to 100°; the angle between the slow axis of the first one-half wave plate and the first direction is in a range of 110° to 120°; the angle between the slow axis of the first quarter wave plate and the first direction is in a range of −10° to 10°; and the retardation amount of light with wavelength of 550 nm by the first quarter wave plate is in a range of 138 nm to 170 nm.

In some embodiments, the angle between the slow axis of the second one-half wave plate and the first direction is in a range of 24° to 27°; and the angle between the slow axis of the second quarter wave plate and the first direction is in a range of 88° to 94°.

In some embodiments, a retardation amount of light by the liquid crystal layer corresponding to the transmissive region is in a range of 228 nm to 402 nm; and a retardation amount of light by the liquid crystal layer corresponding to the reflective region is in a range of 101 nm to 214 nm.

In some embodiments, the retardation amount of light by the liquid crystal layer corresponding to the transmissive region is in a range of 241 nm to 402 nm; and the retardation amount of light by the liquid crystal layer corresponding to the reflective region is in a range of 121 nm to 201 nm.

In some embodiments, the angle between the absorption axis of the first polarizing film and the first direction is 95°; the angle between the slow axis of the first one-half wave plate and the first direction is 115°; the retardation amount of light with wavelength of 550 nm by the first one-half wave plate is 270 nm; the angle between the slow axis of the first quarter wave plate and the first direction is 0°; and the retardation amount of light with wavelength of 550 nm by the first quarter wave plate is 158 nm.

In some embodiments, the angle between the absorption axis of the second polarizing film and the first direction is 5°; the angle between the slow axis of the second one-half wave plate and the first direction is 25°; the retardation amount of light with wavelength of 550 nm by the second one-half wave plate is 270 nm; the angle between the slow axis of the second quarter wave plate and the first direction is 90°; and the retardation amount of light with wavelength of 550 nm by the second quarter wave plate is 110 nm.

In some embodiments, the display module further includes a first alignment film and a second alignment film; wherein the first alignment film is on a side of the first substrate close to the liquid crystal layer; the second alignment film is on a side of the second substrate close to the liquid crystal layer; the first alignment film and the second alignment film are configured so that the liquid crystal layer is in the initial alignment direction without powering up; alignment directions of the first alignment film and the second alignment film are parallel and opposite to each other; and the first direction is perpendicular to the alignment directions of the first alignment film and the second alignment film.

In some embodiments, the display module further includes a scattering film between the second quarter wave plate and the second substrate.

In some embodiments, the first substrate includes a plurality of sub-pixel regions arranged in an array; and each sub-pixel region is divided into the transmissive region and the reflective region.

In some embodiments, the first substrate includes a first base, a pixel circuit, a planarization layer, a reflective layer, and a pixel electrode; the pixel circuit, the planarization layer, the reflective layer and the pixel electrode are sequentially stacked on a side of the first base close to the liquid crystal layer; an orthographic projection of the planarization layer on the first base does not overlap with an orthographic projection of the transmissive region on the first base; an orthographic projection of the reflective layer on the first base does not overlap with the orthographic projection of the transmissive region on the first base; an orthographic projection of the pixel electrode on the first base covers an orthographic projection of each sub-pixel region on the first base; and the pixel electrode is electrically connected to the pixel circuit.

In some embodiments, the first substrate includes a first base, a pixel circuit, a planarization layer, a reflective layer, and a pixel electrode; the pixel circuit, the planarization layer and the reflective layer are sequentially stacked on a side of the first base close to the liquid crystal layer; an orthographic projection of the planarization layer on the first base does not overlap with an orthographic projection of the transmissive region on the first base; an orthographic projection of the reflective layer on the first base does not overlap with the orthographic projection of the transmissive region on the first base; an orthographic projection of the pixel electrode on the first base does not overlap with an orthographic projection of the reflective region on the first base; the pixel electrode is connected to the reflective layer in a lap joint manner; and the pixel electrode or the reflective layer is electrically connected to the pixel circuit.

In some embodiments, the second substrate includes a second base and a common electrode; the common electrode is on a side of the second base close to the liquid crystal layer; and the common electrode is a planar electrode, and an orthographic projection of the common electrode on the first base at least covers an orthographic projection of each sub-pixel region on the first base.

In some embodiments, the display module further includes a backlight module on a side of the first substrate away from the second substrate; wherein an orthographic projection of the backlight module on the first substrate is at least located in the transmissive region, and the backlight module is configured to provide backlight for display in the transmissive region.

In some embodiments, the first polarizing film includes a first protective layer, a first polarizer, and a second protective layer; the first protective layer, the first polarizer, and the second protective layer are sequentially stacked; the second polarizing film includes a third protective layer, a second polarizer, and a fourth protective layer; the third protective layer, the second polarizer, and the fourth protective layer are sequentially stacked; the first polarizing film, the first one-half wave plate and the first quarter wave plate are adhered together by a light-transmitting adhesive; and the second polarizing film, the second one-half wave plate and the second quarter wave plate are adhered together by the light-transmitting adhesive.

In some embodiments, the first polarizer and the second polarizer are all made of an iodine-based or dye-based polyester material; the first one-half wave plate and the second one-half wave plate are both made of an alkylene polymer material; the first quarter wave plate is made of polycarbonate material; and the second quarter wave plate is made of an alkylene polymer material.

The embodiments of the present disclosure further provide a display module, including: a first substrate; a second substrate; a liquid crystal layer in a cell gap between the first substrate and the second substrate; wherein the liquid crystal layer adopts an electrically controlled birefringence type liquid crystal; the display module further includes a first polarizing film, a first one-half wave plate and a first quarter wave plate; the first quarter wave plate, the first one-half wave plate and the first polarizing film are on a side of the first substrate away from the liquid crystal layer and are sequentially stacked in a direction away from the first substrate; the display module further includes a second polarizing film, a second one-half wave plate and a second quarter wave plate; the second quarter wave plate, the second one-half wave plate and the second polarizing film are on a side of the second substrate away from the liquid crystal layer and are sequentially stacked in a direction away from the second substrate; the first substrate includes a transmissive region and a reflective region, and a thickness of the liquid crystal layer in the transmissive region is greater than a thickness of the liquid crystal layer in the reflective region; the transmissive region allows light incident from a side of the first substrate away from the second in substrate to pass through the transmissive region; the reflective region allows light incident from a side of the second substrate away from the first substrate to be reflected; an angle between an absorption axis of the first polarizing film and a first direction is in a range of 85° to 105°; an angle between a slow axis of the first one-half wave plate and the first direction is in a range of 105° to 125°; a retardation amount of light with wavelength of 550 nm by the first one-half wave plate is in a range of 260 nm to 280 nm; an angle between a slow axis of the first quarter wave plate and the first direction is in a range of −20° to 20°; a retardation amount of light with wavelength of 550 nm by the first quarter wave plate is in a range of 136 nm to 170 nm; an angle between an absorption axis of the second polarizing film and the first direction is in a range of 0° to 10°; an angle between a slow axis of the second one-half wave plate and the first direction is in a range of 20° to 30°; a retardation amount of light with wavelength of 550 nm by the second one-half wave plate is in a range of 260 nm to 280 nm; an angle between a slow axis of the second quarter wave plate and the first direction is in a range of 80° to 100°; a retardation amount of light with wavelength of 550 nm by the second quarter wave plate is in a range of 80 nm to 115 nm; a retardation amount of light by the liquid crystal layer corresponding to the transmissive region is in a range of 228 nm to 402 nm; a retardation amount of light by the liquid crystal layer corresponding to the reflective region is in a range of 101 nm to 214 nm; and the first direction is a direction perpendicular to an initial alignment direction of the liquid crystal layer.

In some embodiments, the angle between the absorption axis of the first polarizing film and the first direction is in a range of 90° to 100°; the angle between the slow axis of the first one-half wave plate and the first direction is in a range of 110° to 120°; the angle between the slow axis of the first quarter wave plate and the first direction is in a range of −10° to 10°; and the retardation amount of light with wavelength of 550 nm by the first quarter wave plate is in a range of 138 nm to 170 nm.

In some embodiments, the angle between the slow axis of the second one-half wave plate and the first direction is in a range of 24° to 27°; and the angle between the slow axis of the second quarter wave plate and the first direction is in a range of 88° to 94°.

In some embodiments, the angle between the absorption axis of the first polarizing film and the first direction is 95°; the angle between the slow axis of the first one-half wave plate and the first direction is 115°; the retardation amount of light with wavelength of 550 nm by the first one-half wave plate is 270 nm; the angle between the slow axis of the first quarter wave plate and the first direction is 0°; and the retardation amount of light with wavelength of 550 nm by the first quarter wave plate is 158 nm.

In some embodiments, the angle between the absorption axis of the second polarizing film and the first direction is 5°; the angle between the slow axis of the second one-half wave plate and the first direction is 25°; the retardation amount of light with wavelength of 550 nm by the second one-half wave plate is 270 nm; the angle between the slow axis of the second quarter wave plate and the first direction is 90°; and the retardation amount of light with wavelength of 550 nm by the second quarter wave plate is 110 nm.

In some embodiments, the retardation amount of light by the liquid crystal layer corresponding to the transmissive region is in a range of 241 nm to 402 nm; and the retardation amount of light by the liquid crystal layer corresponding to the reflective region is in a range of 121 nm to 201 nm.

In a second aspect, embodiments of the present disclosure further provide a display apparatus, which includes the display module.

In a third aspect, embodiments of the present disclosure further provide a display method for the display apparatus, including: causing the light incident from a side of the first substrate away from the second substrate to pass through the transmissive region for display in a transmission mode; and causing the light incident from a side of the second substrate away from the first substrate to be reflected by the reflective region for display in a reflective mode; wherein the display method further includes: detecting a brightness of the ambient light; and adjusting a display brightness of the transmissive region according to the brightness of the ambient light; wherein the display brightness of the transmissive region is inversely proportional to the brightness of the ambient light.

BRIEF DESCRIPTION OF DRAWINGS

The accompanying drawings, which are provided for further understanding of embodiments of the present disclosure and constitute a part of this specification, are for explaining the present disclosure together with the embodiments of the present disclosure, but are not intended to limit the present disclosure. The above and other features and advantages will become more apparent to ordinary skill in the art by describing in detail exemplary embodiments thereof with reference to the drawings. In the drawings:

FIG. 5 is a schematic diagram of simulation data for an angle between a slow axis of a first one-half wave plate and a first direction and an angle between a slow axis of a first quarter wave plate and the first direction according to embodiments of the present disclosure.

FIG. 7 is a schematic diagram of simulation data for different retardation amounts of a first quarter wave plate according to embodiments of the present disclosure.

FIG. 9 is a schematic diagram of simulation data for an angle between a slow axis of a second one-half wave plate and a first direction and an angle between a slow axis of a second quarter wave plate and the first direction according to embodiments of the present disclosure.

FIG. 11 is a schematic diagram of simulation data for different retardation amounts of a second quarter wave plate according to embodiments of the present disclosure.

FIG. 13 is a schematic diagram of simulated data for different retardation amounts of light by (a portion of) a liquid crystal layer corresponding to a reflective region according to embodiments of the present disclosure.

FIG. 15 is a schematic diagram of simulated data for different retardation amounts of light by a liquid crystal layer corresponding to a transmissive region according to embodiments of the present disclosure.

DETAIL DESCRIPTION OF EMBODIMENTS

Figure 1:
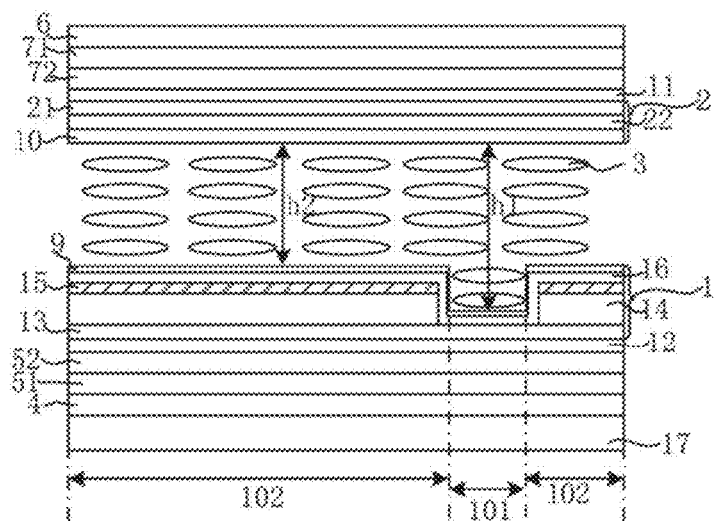
FIG. 1 is a cross-sectional view of a structure of a portion of a display module corresponding to a sub-pixel region according to embodiments of the present disclosure.

In order to enable one of ordinary skill in the art to better understand the technical solutions of the embodiments of the present disclosure, a display module, a display apparatus and a display method for the display apparatus provided by the embodiments of the present disclosure will be described in further detail with reference to the accompanying drawings and the detailed description.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that this disclosure will be thorough and complete, and will fully convey the scope of the present disclosure to one ordinary skill in the art.

The disclosed embodiments are not limited to the embodiments shown in the drawings, but include modifications of configurations formed based on a manufacturing process. Thus, areas illustrated in the drawings have schematic properties, and shapes of the areas shown in the drawings illustrate specific shapes of the areas, but are not intended to be limiting.

In the prior art, in an existing transflective liquid crystal display module, a λ/2 wave plate and a λ/4 wave plate are respectively provided in an upper polarizing film and a lower polarizing film, the upper polarizing film and the lower polarizing film as well as the provided λ/2 wave plate and the provided λ/4 wave plate match with a liquid crystal cell, and thus, a linear-circular polarization conversion of polarized light is realized, so that the opening and closing of a light path are realized through power dump/up, and further a transmission/reflection display of the transflective liquid crystal display module is realized. However, in a practical application, the λ/2 wave plate, the λ/4 wave plate and the liquid crystal cell all have a dispersion effect, so that there is a difference among the linear-circular polarization conversion efficiencies of the λ/2 wave plate, the λ/4 wave plate and the liquid crystal cell for light of different wave bands in the whole visible light wave band, which macroscopically shows that the transflective liquid crystal display module has problems such as low brightness (namely, low reflectivity/ transmittance), low contrast, color shift and the like.

Aiming at the problems of low brightness, low contrast, color shift and the like of the transflective liquid crystal display module in the prior art, the embodiments of the present disclosure further provide a display module, referring to FIG. 1, which includes: a first substrate 1; a second substrate 2; a liquid crystal layer 3 in a cell gap between the first substrate 1 and the second substrate 2; the display module further includes a first polarizing film 4, a first one-half wave plate 51 and a first quarter wave plate 52; the first quarter wave plate 52, the first one-half wave plate 51 and the first polarizing film 4 are positioned on a side of the first substrate 1 away from the liquid crystal layer 3 and are sequentially stacked in a direction away from the first substrate 1; the first substrate 1 includes a transmissive region 101 and a reflective region 102, and a thickness h1 of (a portion of) the liquid crystal layer 3 in the transmissive region 101 is greater than a thickness h2 of the liquid crystal layer 3 in the reflective region 102; the transmissive region 101 allows light incident from a side of the first substrate 1 away from the second substrate 2 to pass through the transmissive region 101; the reflective region 102 allows light incident from a side of the second substrate 2 away from the first substrate 1 to be reflected; an angle between an absorption axis of the first polarizing film 4 and a first direction is in a range of 85° to 105°; an angle between a slow axis of the first one-half wave plate 51 and the first direction is in a range of 105° to 125°; a retardation amount of light with wavelength of 550 nm by the first one-half wave plate 51 is in a range of 260 nm to 280 nm; an angle between a slow axis of the first quarter wave plate 52 and the first direction is in a range of −20° to 20°; a retardation amount of light with wavelength of 550 nm by the first quarter wave plate 52 is in a range of 136 nm to 170 nm; the first direction is a direction perpendicular to an initial alignment direction of the liquid crystal layer 3.

In some embodiments, the display module further includes a second polarizing film 6, a second one-half wave plate 71 and a second quarter wave plate 72; the second quarter wave plate 72, the second one-half wave plate 71 and the second polarizing film 6 are positioned on a side of the second substrate 2 away from the liquid crystal layer 3 and are sequentially stacked in a direction away from the second substrate 2; an angle between an absorption axis of the second polarizing film 6 and the first direction is in a range of 0° to 10°; an angle between a slow axis of the second one-half wave plate 71 and the first direction is in a range of 20° to 30°; a retardation amount of light with wavelength of 550 nm by the second one-half wave plate 71 is in a range of 260 nm to 280 nm; an angle between a slow axis of the second quarter wave plate 72 and the first direction is in a range of 80° to 100°; a retardation amount of light with wavelength of 550 nm by the second quarter wave plate 72 is in a range of 80 nm to 115 nm.

Figure 2:
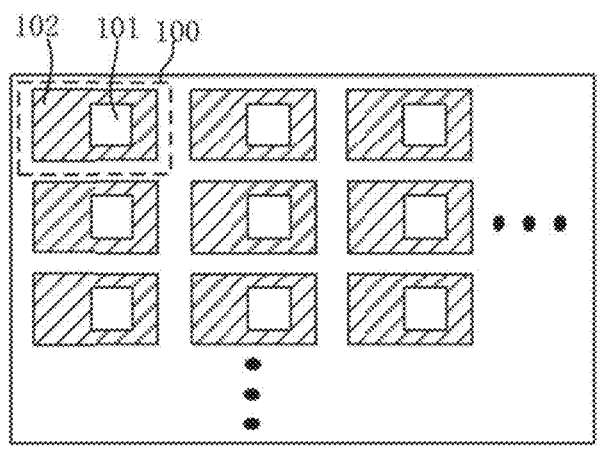
FIG. 2 is a schematic diagram illustrating an arrangement of sub-pixel regions in a display module according to embodiments of the present disclosure.

In some embodiments, referring to FIG. 2, the first substrate 1 includes a plurality of sub-pixel regions 100 arranged in an array; each sub-pixel region 100 is divided into a transmissive region 101 and a reflective region 102. The reflective region 102 is provided with a metal reflective layer configured to reflect ambient light incident from the side of the second substrate 2 away from the first substrate 1, a backlight incident from the side of the first substrate 1 away from the second substrate 2 cannot pass through the metal reflective layer. The transmissive region 101 is not provided with a metal reflective layer, so that the ambient light incident from the side of the second substrate 2 away from the first substrate 1 cannot be reflected, but the backlight light incident from the side of the first substrate 1 away from the second substrate 2 may pass through the metal reflective layer. In this way, the transflective display of the display module can be realized.

By dividing each sub-pixel region 100 of the first substrate 1 into the transmissive region 101 and the reflective region 102, a ratio of an area of the transmissive region 101 to an area of the reflective region 102 in each sub-pixel region 100 can be flexibly designed and adjusted according to the actual requirements of the display modules with different models or types on the transmissive brightness and the reflective brightness in the display process in practical application.

In some embodiments, a shape of each of the transmissive region 101 and the reflective region 102 in the sub-pixel region 100 may be any shape as long as it is ensured that the transmissive region 101 and the reflective region 102 are spliced together to form the whole sub-pixel region 100. For example: referring to FIG. 2, the transmissive region 101 may have a rectangular shape with a small area ratio, that is, the transmissive region 101 is an aperture region whose an orthographic projection on the display module is rectangular; the reflective region 102 is a region of the sub-pixel region 100 having a large area ratio except for the transmissive region 101.

In the embodiment, the linearly polarized light is still the linearly polarized light after passing through the first one-half wave plate 51 used to perform a phase compensation on a part of the light passing through the first one-half wave plate 51, so as to improve the efficiency of the first quarter wave plate 52 on the linear-circular polarization state conversion of the visible light with different wave bands; the linearly polarized light is still the linearly polarized light after passing through the second one-half wave plate 71 used to perform a phase compensation on a part of the light passing through the second one-half wave plate 71, so as to improve the efficiency of the second quarter wave plate 72 on the linear-circular polarization state conversion of the visible light with different wave bands and further improve the light efficiency of displaying by the display module in a white state, and reduce the light leak in a dark state. A polarization angle of the linearly polarized light without passing through the first one-half wave plate 51 or the second one-half wave plate 71 and a polarization angle of the linearly polarized light passing through the first one-half wave plate 51 or the second one-half wave plate 71 are mirror symmetric angles. When an angle between a polarization direction of the linearly polarized light passing through the first quarter wave plate 52 or the second quarter wave plate 72 and a direction of the slow axis (a slow axis direction) of the first quarter wave plate 52 or the second quarter wave plate 72 is 45°, the first quarter wave plate 52 or the second quarter wave plate 72 may convert the linearly polarized light into the circularly polarized light; the first quarter wave plate 52 and the second quarter wave plate 72 are used for realizing the linear-circular polarization state conversion of light passing through the first quarter wave plate 52 and the second quarter wave plate 72, so as to realize the opening and closing of the light path of the transflective display module.

In some embodiments, the first one-half wave plate 51 and the second one-half wave plate 71 are both made of an alkylene polymer material (i.e., COP); the wave plate made of the material is uniaxially stretched to form a one-half wave plate with a fast axis and a slow axis, and a stretching direction of the one-half wave plate is the slow axis direction of the one-half wave plate. The first quarter wave plate 52 is made of polycarbonate (i.e., PC); the wave plate made of the material is uniaxially stretched to form a quarter wave plate with a fast axis and a slow axis, and a stretching direction of the quarter wave plate is the slow axis direction of the quarter wave plate. The second quarter wave plate 72 is made of an alkylene polymer material (i.e., COP); the wave plate made of the material is uniaxially stretched to form a quarter wave plate with a fast axis and a slow axis. A light vector direction with low propagation speed in the wave plate is a slow axis, and a light vector direction with high propagation speed in the wave plate is a fast axis.

Figure 3A:
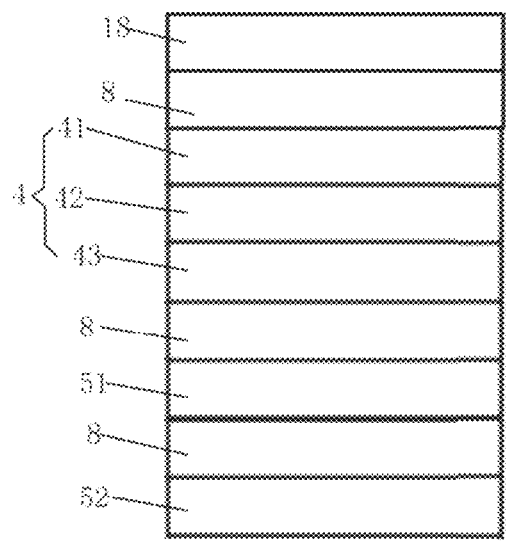
FIG. 3a is a schematic diagram of a first polarizing film, a first one-half wave plate and a first quarter wave plate sequentially stacked according to embodiments of the present disclosure.

In some embodiments, referring to FIG. 3a, the first polarizing film 4 includes a first protective layer 41, a first polarizer 42, and a second protective layer 43; the first protective layer 41, the first polarizer 42, and the second protective layer 43 are sequentially stacked. The first polarizing film 4, the first one-half wave plate 51 and the first quarter wave plate 52 are adhered together by a light-transmitting adhesive 8 to have a one-piece structure (so that the first polarizing film 4, the first one-half wave plate 51 and the first quarter wave plate 52 have a one-piece structure).

Figure 3B:
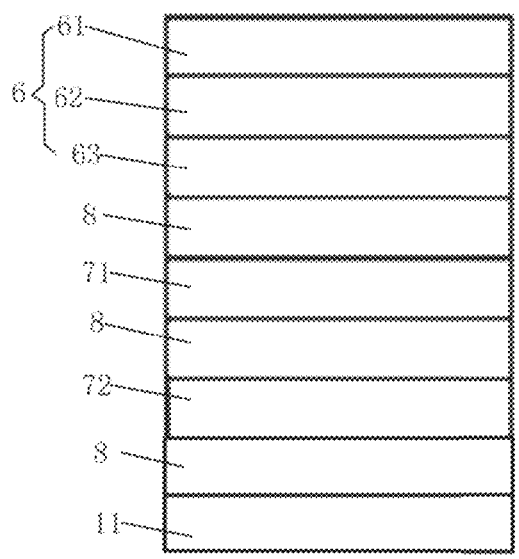
FIG. 3b is a schematic diagram of a second polarizing film, a second one-half wave plate and a second quarter wave plate sequentially stacked according to embodiments of the present disclosure.

In some embodiments, referring to FIG. 3b, the second polarizing film 6 includes a third protective layer 61, a second polarizer 62, and a fourth protective layer 63; the third protective layer 61, the second polarizer 62, and the fourth protective layer 63 are sequentially stacked. The second polarizing film 6, the second one-half wave plate 71 and the second quarter wave plate 72 are adhered together by the light-transmitting adhesive 8 to have a one-piece structure.

In some embodiments, when the first polarizing film 4, the first one-half wave plate 51 and the first quarter wave plate 52 are disposed on the first substrate, the first polarizing film 4, the first one-half wave plate 51 and the first quarter wave plate 52 may be separately attached to the first substrate; alternatively, the one-piece structure formed by adhering together the first polarizing film 4, the first one-half wave plate 51 and the first quarter wave plate 52 may be attached to the first substrate.

In some embodiments, when the second polarizing film 6, the second one-half wave plate 71 and the second quarter wave plate 72 are disposed on the second substrate, the second polarizing film 6, the second one-half wave plate 71 and the second quarter wave plate 72 may be separately attached to the second substrate; alternatively, the one-piece structure formed by adhering together the second polarizing film 6, the second one-half wave plate 71 and the second quarter wave plate 72 may be attached to the second substrate.

In some embodiments, the first polarizer 42 and the second polarizer 62 are all made of an iodine-based or dye-based polyester material, such as a polyvinyl alcohol (PVA) material; the first protective layer 41, the second protective layer 43, the third protective layer 61, and the fourth protective layer 63 are all made of, for example, triacetyl cellulose (TAC). The first polarizer 42 and the second polarizer 62 are used for converting natural light into linearly polarized light, but the PVA material is very easy to hydrolyze. Thus, in order to protect the physical properties of the polarizing film, TAC films, each having high light transmittance, good water resistance and certain mechanical strength, are compounded on two sides of the PVA material, respectively for the protection purpose.

In some embodiments, the polarizer is uniaxially stretched to form a polarizer having an absorption axis and a transmission axis, the stretching direction is a direction of the absorption axis of the polarizer and the absorption axis and the transmission axis are perpendicular to each other.

Ambient light and backlight all belong to the natural light, including the light in a plurality of polarization directions; the light in the natural light in a polarization direction parallel to the direction of the absorption axis of the polarizer may be absorbed, and the light in the natural light in a polarization direction perpendicular to a direction of the absorption axis of polarizer may pass through the polarizer.

In some embodiments, referring to FIG. 1, the display module further includes a first alignment film 9 and a second alignment film 10; the first alignment film 9 is positioned on a side of the first substrate 1 close to the liquid crystal layer; the second alignment film 10 is positioned on a side of the second substrate 2 close to the liquid crystal layer; the first alignment film 9 and the second alignment film 10 are configured so that the liquid crystals are in the initial alignment direction without powering up; alignment directions of the first alignment film 9 and the second alignment film 10 are parallel and opposite to each other.

Figure 4A:
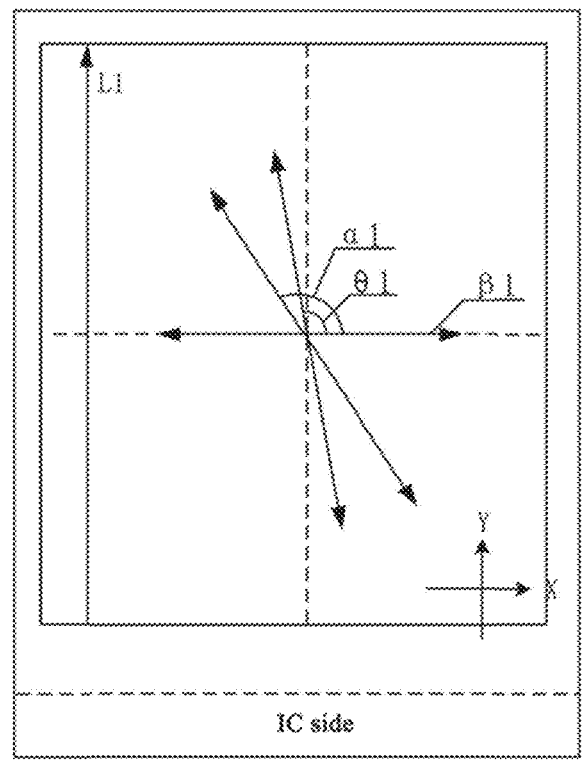
FIG. 4a is a schematic diagram illustrating an angle between an alignment direction of a first alignment film and an optical axis of each of a first polarizing film, a first one-half wave plate and a first quarter wave plate in a display module according to embodiments of the present disclosure.
Figure 4B:
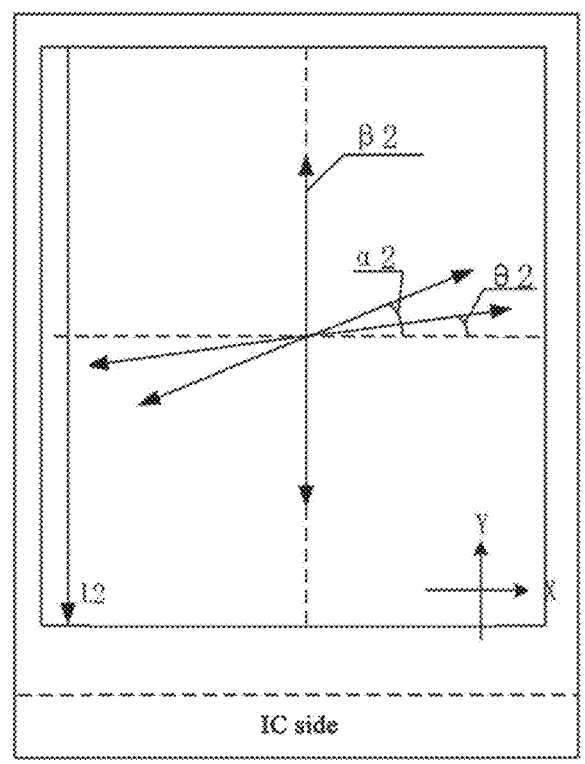
FIG. 4b is a schematic diagram illustrating an angle between an alignment direction of a second alignment film and an optical axis of each of a second polarizing film, a second one-half wave plate and a second quarter wave plate in a display module according to embodiments of the present disclosure.

In this embodiment, referring to FIGS. 4a and 4b, a bonding region is usually disposed on a side of a plane where the display module is located, and a driving chip (i.e., a driving IC) is disposed in the bonding region and configured to drive the display module to display. The alignment direction of the first alignment film is a rubbing alignment direction of the first alignment film, and is defined as a direction L1 from the side where the driving chip (i.e., the driving IC) of the display module is provided to the opposite side; the alignment direction of the second alignment film is a rubbing alignment direction of the second alignment film, and is defined as a direction L2 parallel to and opposite to the direction L1.

In some embodiments, a planar rectangular coordinate system is established in the plane where the display module is located, and the alignment direction L1 of the first alignment film is defined as a Y-axis direction of the planar rectangular coordinate system, and a direction with an angle of 90° with the alignment direction L1 of the first alignment film is defined as an X-axis direction of the planar rectangular coordinate system. The X-axis direction is defined as the first direction, the angle between the alignment direction L1 of the first alignment film and the first direction is 90°; an angle between the alignment direction L2 of the second alignment film and the first direction is −90°. That is, the first direction is perpendicular to the alignment directions of the first alignment film and the second alignment film.

In some embodiments, referring to FIGS. 4a and 4b, an angle θ1 between the absorption axis of the first polarizing film and the first direction is in a range of 90° to 100°; an angle α1 between the slow axis of the first one-half wave plate and the first direction is in a range of 110° to 120°; an angle β1 between the slow axis of the first quarter wave plate and the first direction is in a range of −10° to 10°; the retardation amount of light with wavelength of 550 nm by the first quarter wave plate is in a range of 138 nm to 170 nm.

In some embodiments, referring to FIGS. 4a and 4b, the angle θ1 between the absorption axis of the first polarizing film and the first direction is 95°; the angle α1 between the slow axis of the first one-half wave plate and the first direction is 115°; the retardation amount of light with wavelength of 550 nm by the first one-half wave plate is 270 nm; the angle β1 between the slow axis of the first quarter wave plate and the first direction is 0°; the retardation amount of light with wavelength of 550 nm by the first quarter wave plate is 158 nm.

In some embodiments, referring to FIGS. 4a and 4b, an angle θ2 between the absorption axis of the second polarizing film and the first direction is in a range of 0° to 10°; an angle α2 between the slow axis of the second one-half wave plate and the first direction is in a range of 24° to 27°; an angle β2 between the slow axis of the second quarter wave plate and the first direction is in a range of 88° to 94°.

In some embodiments, referring to FIGS. 4a and 4b, the angle θ2 between the absorption axis of the second polarizing film and the first direction is 5°; the angle α2 between the slow axis of the second one-half wave plate and the first direction is 25°; the retardation amount of light with wavelength of 550 nm by the second one-half wave plate is 270 nm; the angle β2 between the slow axis of the second quarter wave plate and the first direction is 90°; the retardation amount of light with wavelength of 550 nm by the second quarter wave plate is 110 nm.

In this embodiment, a calculation formula for the retardation amounts of the first one-half wave plate and the second one-half wave plate is as follows: $R0=(nx-ny) \times d2$; where d2 is a thickness of the wave plate; nx and ny are respectively refractive indexes of a slow axis and a fast axis of a one-half wave plate to light with wavelength of 550 nm.

In this embodiment, the absorption axis of the first polarizing film, the slow axis of the first one-half wave plate, and the slow axis of the first quarter wave plate are all disposed at angles viewed from the second substrate side by human eyes. The absorption axis of the second polarizing film, the slow axis of the second one-half wave plate, and the slow axis of the second quarter wave plate are all disposed at angles viewed from the second substrate side by human eyes.

In this embodiment, a calculation formula for the retardation amounts of the first quarter wave plate and the second quarter wave plate is as follows: $R0=(nx'-ny') \times d1$; where d1 is a thickness of the wave plate; nx' and ny' are respectively refractive indexes of a slow axis and a fast axis of a quarter wave plate to light with wavelength of 550 nm.

The wavelength of 550 nm is a standard reference wavelength in design, and currently, is substantially taken as a standard for designing parameters of the wave plates and the polarizers in the display module.

In some embodiments, referring to FIG. 1, a retardation amount of light by (a portion of) the liquid crystal layer 3 corresponding to the transmissive region 101 is in a range of 228 nm to 402 nm; a retardation amount of light by the liquid crystal layer 3 corresponding to the reflective region 102 is in a range of 101 nm to 214 nm.

In some embodiments, the retardation amount of light by (a portion of) the liquid crystal layer 3 corresponding to the transmissive region 101 is in a range of 241 nm to 402 nm; the retardation amount of light by the liquid crystal layer 3 corresponding to the reflective region 102 is in a range of 121 nm to 201 nm.

The calculation formula for the retardation amount of the liquid crystal cell formed by the first substrate 1, the second substrate 2 and the liquid crystal layer 3 in the cell gap between the first substrate and the second substrate is as follows: the calculation formula for the retardation amount of the reflective region 102: Re. (reflective)=$\Delta n \times h2$; the calculation formula for the retardation calculation of the transmissive region 101: Re. (transmissive)=$\Delta n \times h1$; where h1 is a thickness of the liquid crystal layer 3 in the transmissive region 101; h2 is a thickness of the liquid crystal layer 3 in the reflective region 102; $\Delta n$ is a difference between refractive indexes of major and minor axes of each liquid crystal molecule in the liquid crystal layer 3 to the incident light.

In the present embodiment, in the following feasibility simulation test of the axial angles of the respective polarizing films and respective phase retardation films in the display module, the first polarizing film and a first phase retardation combined film are referred to as a first light conversion layer; the second polarizing film and a second phase retardation combined film are referred to as a second light conversion layer. The first one-half wave plate and the second one-half wave plate are both referred to as λ/2 or λ/2 wave plates; the first quarter wave plate and the second quarter wave plate are both referred to as λ/4 or λ/4 wave plates; the retardation amount is represented by Re.; the liquid crystal layer is represented by LC; the contrast is represented by CR.

Figure 5:
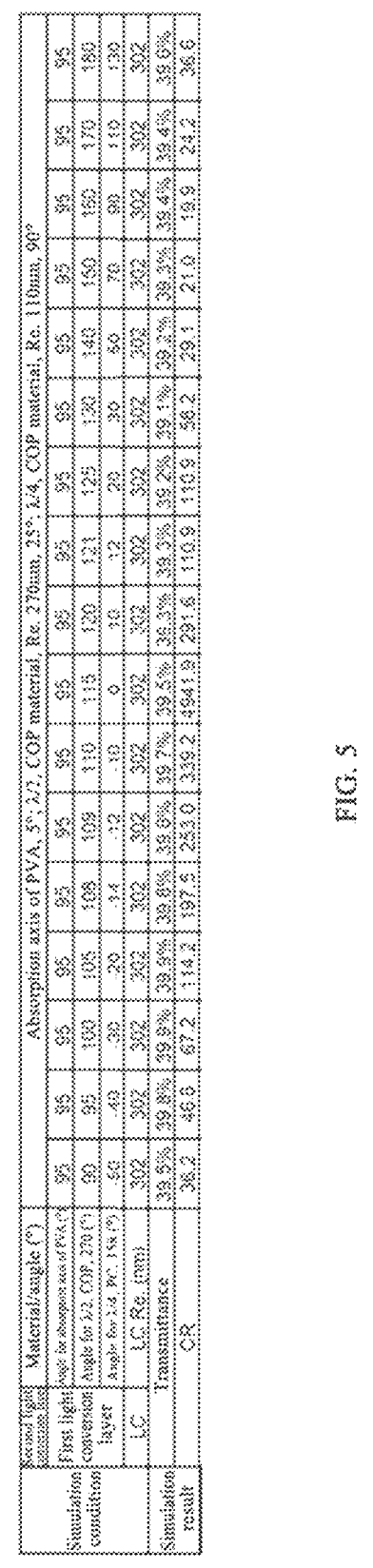
Figure 6:
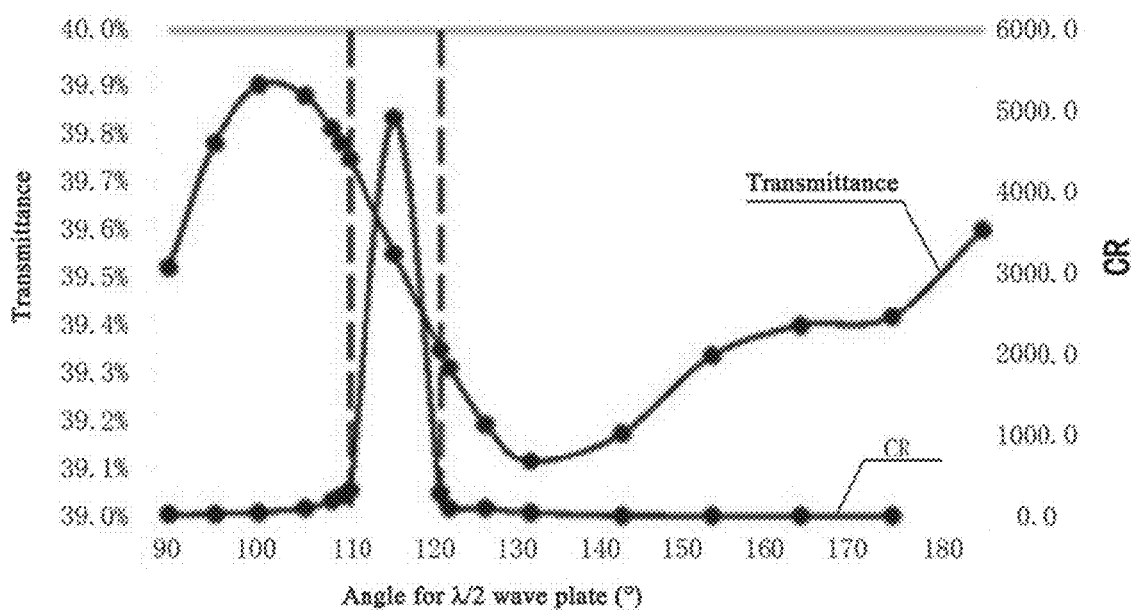
FIG. 6 is a schematic diagram illustrating a relationship between the angle between the slow axis of the first one-half wave plate and the first direction and each of a transmittance and a contrast of the display module plotted according to the simulation data in FIG. 5.

In this embodiment, referring to FIGS. 5 and 6, the following parameter simulation is performed on the display module mainly in consideration of a transmissive mode of the display module: the angle between the absorption axis of the second polarizing film and the first direction is 5°; the second one-half wave plate is made of the COP material, the angle between the slow axis of the second one-half wave plate and the first direction is 25°, and the retardation amount of light with wavelength of 550 nm by the second one-half wave plate is 270 nm; the second quarter wave plate is made of the COP material, the angle between the slow axis of the second quarter wave plate and the first direction is 90°; and the angle between the absorption axis of the first polarizing film and the first direction is caused to be 95° under the condition that the retardation amount of light with wavelength of 550 nm by the second quarter wave plate is 110 nm; the first one-half wave plate is made of the COP material, and the retardation amount of light with wavelength of 550 nm by the first one-half wave plate is 270 nm; the first quarter wave plate is made of the PC material, and the retardation amount of light with wavelength of 550 nm by the first quarter wave plate is 158 nm; when the retardation amount of light by the liquid crystal layer corresponding to the transmissive region is 302 nm, the angle between the slow axis of the first one-half wave plate and the first direction and the angle between the slow axis of the first quarter wave plate and the first direction are combined and simulated, and the simulation result is represented by a display transmittance and a contrast of the display module. The simulation result shows that in consideration of the transmittance and the contrast of the display module, the angle between the slow axis of the first one-half wave plate and the first direction is preferably in a range of 110° to 120°, correspondingly, the angle between the slow axis of the first quarter wave plate and the first direction is preferably in a range of −10° to 10°, in this case, the transmittance and the contrast of the display module are better.

Figure 8:
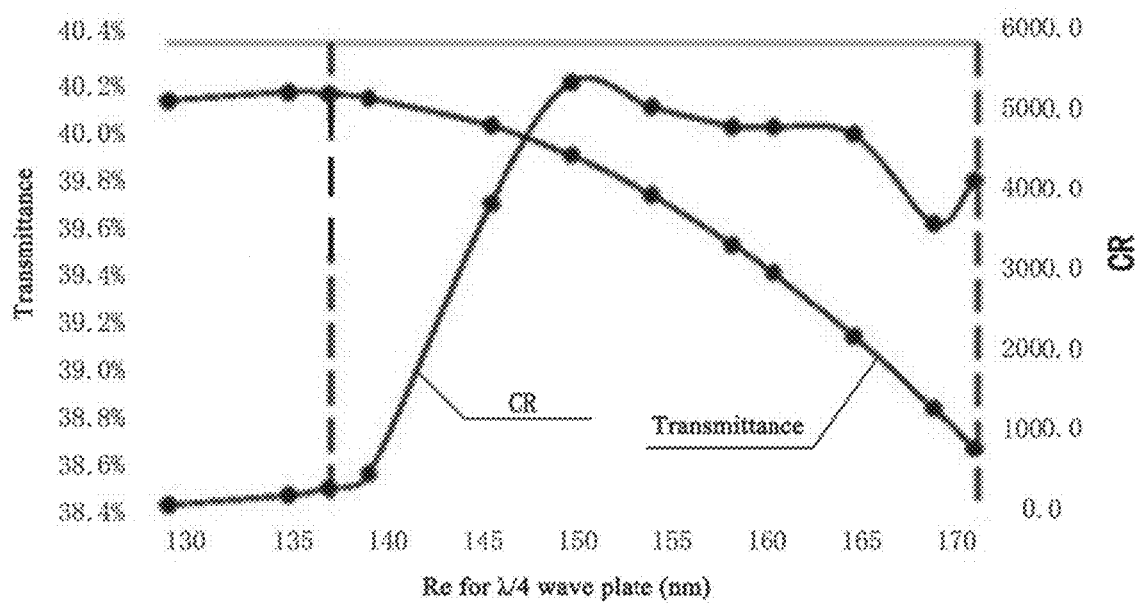
FIG. 8 is a schematic diagram illustrating a relationship between different retardation amounts of the first quarter wave plate and each of a transmittance and a contrast of the display module plotted according to the simulation data in FIG. 7.

In this embodiment, referring to FIGS. 7 and 8, different retardation amounts of the first quarter wave plate are simulated under the following conditions: the angle between the absorption axis of the second polarizing film and the first direction is 5°; the second one-half wave plate is made of the COP material, the angle between the slow axis of the second one-half wave plate and the first direction is 25°, and the retardation amount of light with wavelength of 550 nm by the second one-half wave plate is 270 nm; the second quarter wave plate is made of the COP material, the angle between the slow axis of the second quarter wave plate and the first direction is 90°, and the angle between the absorption axis of the first polarizing film and the first direction is 95°; the first one-half wave plate is made of the COP material, the angle between the slow axis of the first one-half wave plate and the first direction is 115°, and the retardation amount of light with wavelength of 550 nm by the first one-half wave plate is 270 nm; the first quarter wave plate is made of the COP material, and the angle between the slow axis of the first quarter wave plate and the first direction is 0°; the retardation amount of light by the liquid crystal layer corresponding to the transmissive region is 302 nm. The simulation result shows that in consideration of the transmittance and the contrast of the display module, the retardation amount of light with wavelength of 550 nm by the first quarter wave plate is preferably in a range of 138 nm to 170 nm, in this case, the transmittance and the contrast of the display module are better.

Figure 10:
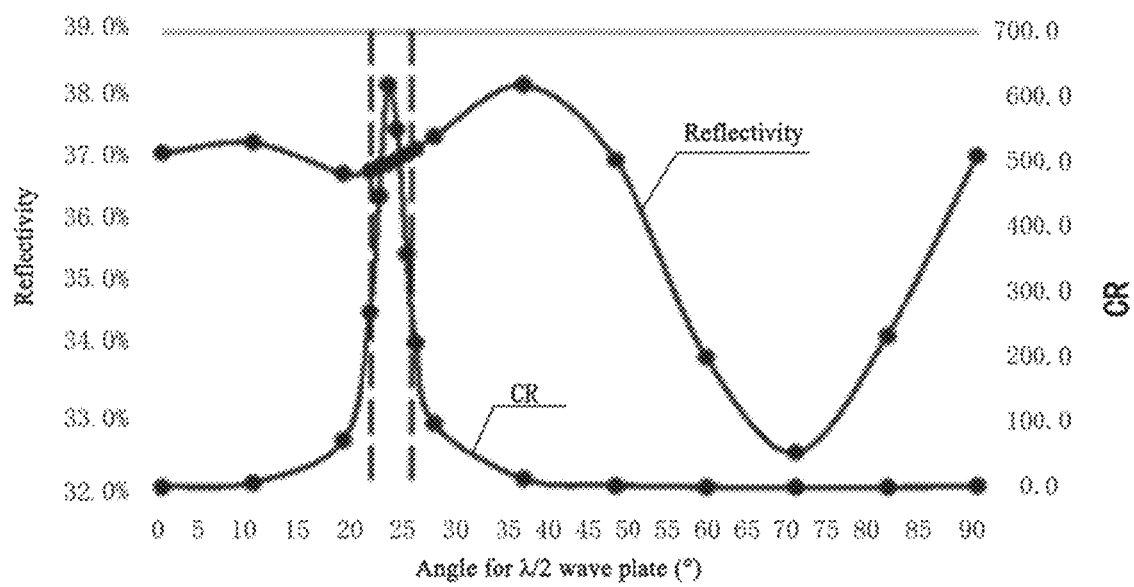
FIG. 10 is a schematic diagram illustrating a relationship between the angle between the slow axis of the second one-half wave plate and the first direction and each of a transmittance and a contrast of the display module plotted according to the simulation data in FIG. 9.

In this embodiment, referring to FIGS. 9 and 10, the following parameter simulation is performed on the display module mainly in consideration of a reflective mode of the display module: the angle between the absorption axis of the second polarizing film and the first direction is 5°; the second one-half wave plate is made of the COP material, and the retardation amount of light with wavelength of 550 nm by the second one-half wave plate is 270 nm; the second quarter wave plate is made of the COP material, and when the retardation amount of the light with wavelength of 550 nm by the second quarter wave plate is 110 nm, and the retardation amount of light by the liquid crystal layer corresponding to the reflective region is 147 nm, the angle between the slow axis of the second one-half wave plate and the first direction and the angle between the slow axis of the second quarter wave plate and the first direction are combined and simulated, and in consideration of a reflectivity and the contrast of the display module, the angle between the slow axis of the second one-half wave plate and the first direction is preferably in a range of 24° to 27°, and correspondingly, the angle between the slow axis of the second quarter wave plate and the first direction is preferably in a range of 88° to 94°, in this case, the reflectivity and the contrast of the display module are better.

Figure 12:
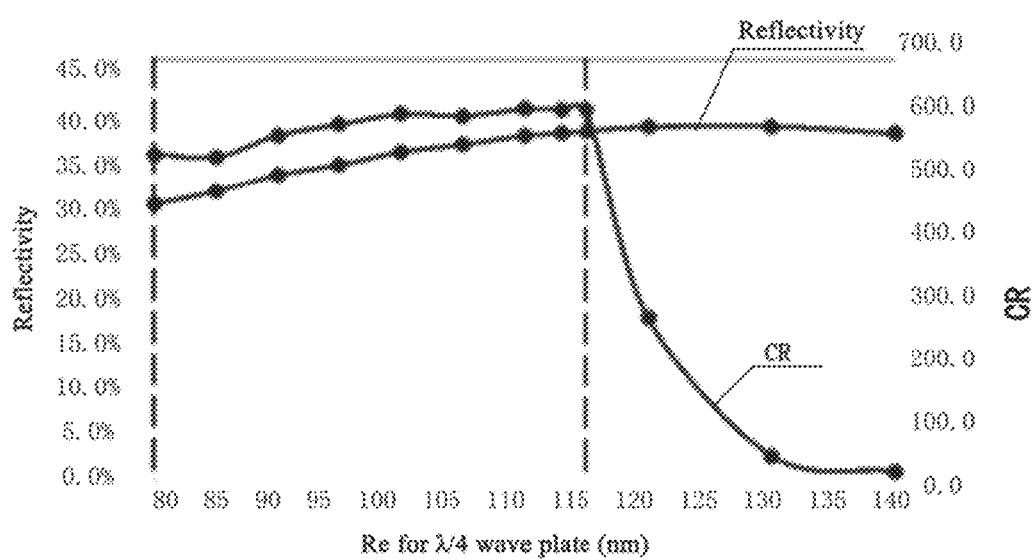
FIG. 12 is a schematic diagram illustrating a relationship between different retardation amounts of the second quarter wave plate and each of a reflectivity and a contrast of the display module plotted according to the simulation data in FIG. 11.

In this embodiment, referring to FIGS. 11 and 12, different retardation amounts of the second quarter wave plate are simulated under the following conditions: the angle between the absorption axis of the second polarizing film and the first direction is 5°; the second one-half wave plate is made of the COP material, the angle between the slow axis of the second one-half wave plate and the first direction is 25°, and the retardation amount of light with wavelength of 550 nm by the second one-half wave plate is 270 nm; the second quarter wave plate is made of the COP material, and the angle between the slow axis of the second quarter wave plate and the first direction is 90°; the retardation amount of light by the liquid crystal layer corresponding to the reflective region is 147 nm; the simulation result shows that in consideration of the reflectivity and the contrast of the display module, the retardation amount of light with wavelength of 550 nm by the second quarter wave plate is preferably in a range of 80 nm to 115 nm, in this case, the reflectivity and the contrast of the display module are better.

Figure 14:
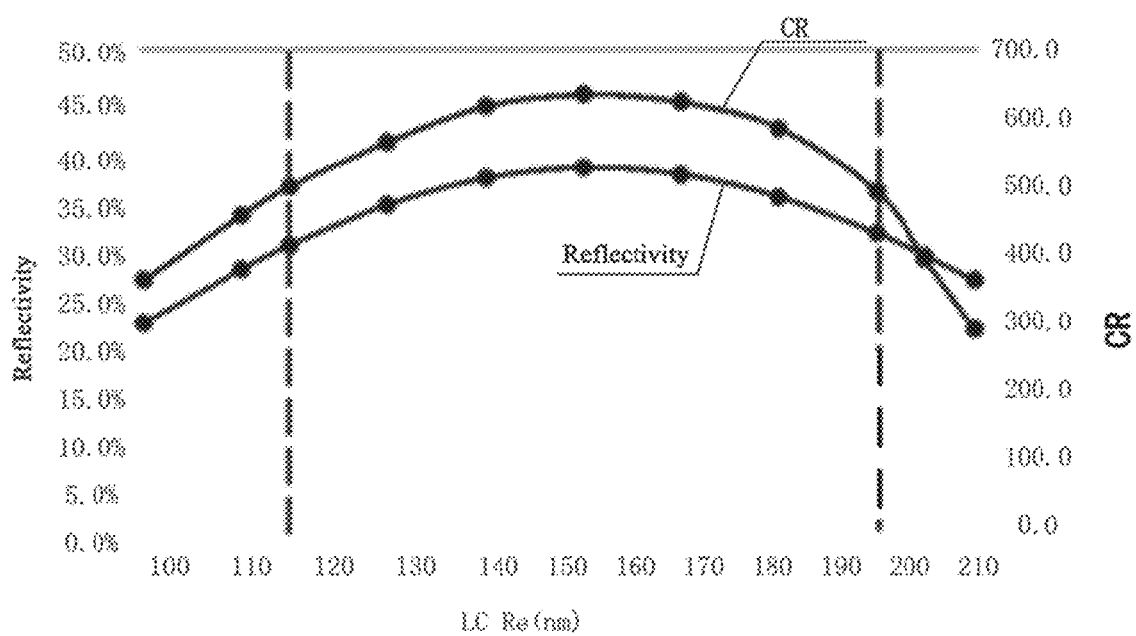
FIG. 14 is a schematic diagram illustrating a relationship between different retardation amounts of light by the liquid crystal layer corresponding to the reflective region and each of a reflectivity and a contrast of the display module plotted according to the simulation data in FIG. 13.

In this embodiment, referring to FIGS. 13 and 14, different retardation amounts of light by the liquid crystal layer corresponding to the reflective region are simulated under the following conditions: the angle between the absorption axis of the second polarizing film and the first direction is 5°; the second one-half wave plate is made of the COP material, the angle between the slow axis of the second one-half wave plate and the first direction is 25°, and the retardation amount of light with wavelength of 550 nm by the second one-half wave plate is 270 nm; the second quarter wave plate is made of the COP material, and the angle between the slow axis of the second quarter wave plate and the first direction is 90°; the retardation amount of light with wavelength of 550 nm by the second quarter wave plate is 110 nm; the angle between the absorption axis of the first polarizing film and the first direction is 95°; the first one-half wave plate is made of the COP material, the angle between the slow axis of the first one-half wave plate and the first direction is 115°, and the retardation amount of light with wavelength of 550 nm by the first one-half wave plate is 270 nm; the first quarter wave plate is made of the COP material, and the angle between the slow axis of the first quarter wave plate and the first direction is 0°; the retardation amount of light with wavelength of 550 nm by the first quarter wave plate is 110 nm; the simulation result shows that in consideration of the reflectivity and the contrast of the display module, the retardation amount of light by the liquid crystal layer corresponding to the reflective region is preferably in a range of 121 nm to 201 nm, in this case, the reflectivity and the contrast of the display module are better.

Figure 15:
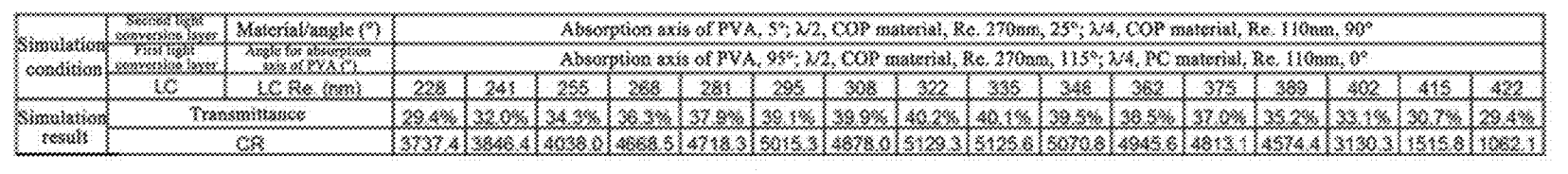
Figure 16:
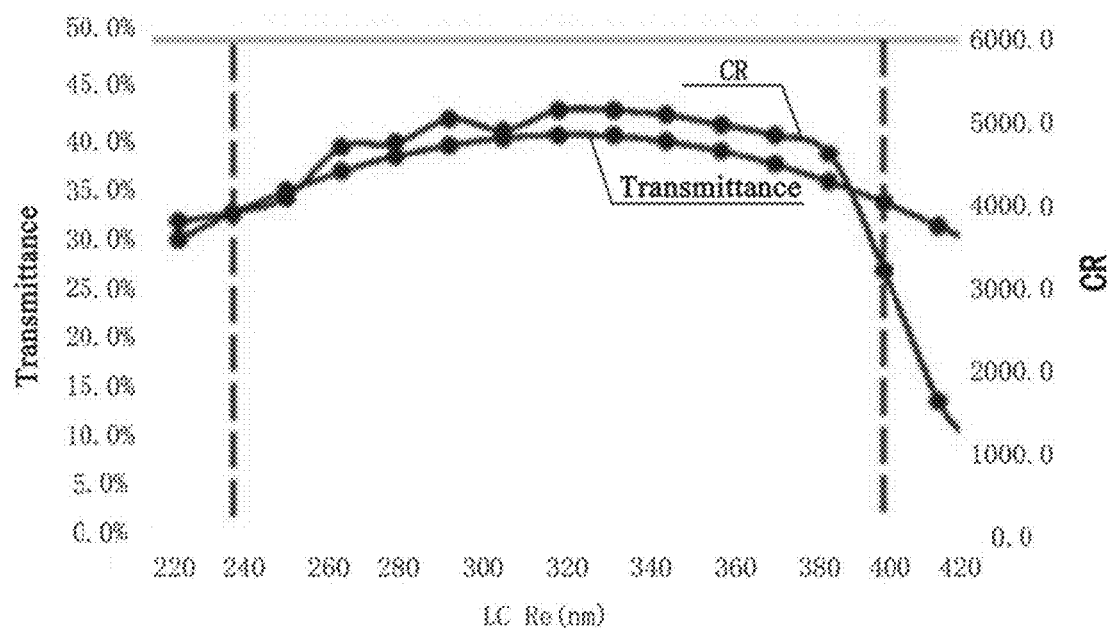
FIG. 16 is a schematic diagram illustrating a relationship between different retardation amounts of light by the liquid crystal layer corresponding to the transmissive region and each of a transmittance and a contrast of the display module plotted according to the simulation data in FIG. 15.

In this embodiment, referring to FIGS. 15 and FIG. 16, different retardation amounts of light by the liquid crystal layer corresponding to the transmissive region are simulated under the following conditions: the angle between the absorption axis of the second polarizing film and the first direction is 5°; the second one-half wave plate is made of the COP material, the angle between the slow axis of the second one-half wave plate and the first direction is 25°, and the retardation amount of light with wavelength of 550 nm by the second one-half wave plate is 270 nm; the second quarter wave plate is made of the COP material, and the angle between the slow axis of the second quarter wave plate and the first direction is 90°; the retardation amount of light with wavelength of 550 nm by the second quarter wave plate is 110 nm; the angle between the absorption axis of the first polarizing film and the first direction is 95°; the first one-half wave plate is made of the COP material, the angle between the slow axis of the first one-half wave plate and the first direction is 115°, and the retardation amount of light with wavelength of 550 nm by the first one-half wave plate is 270 nm; the first quarter wave plate is made of the COP material, and the angle between the slow axis of the first quarter wave plate and the first direction is 0°; the retardation amount of light with wavelength of 550 nm by the first quarter wave plate is 110 nm; the simulation result shows that in consideration of the transmittance and the contrast of the display module, the retardation amount of light by the liquid crystal layer corresponding to the transmissive region is preferably in a range of 241 nm to 402 nm, in this case, the transmittance and the contrast of the display module are better.

In summary, through the above combining and matching design in the display module on the direction of the absorption axis of each of the first polarizing film 4 and the second polarizing film 6, the direction of the slow axis of each of the first one-half wave plate 51 and the first quarter wave plate 52 in the first phase retardation combined film 5 and the retardation amount of light with wavelength of 550 nm by each of the first one-half wave plate 51 and the first quarter wave plate 52 in the first phase retardation combined film 5, the direction of the slow axis of each of the second one-half wave plate 71 and the second quarter wave plate 72 in the second phase retardation combined film 7 and the retardation amount of light with wavelength of 550 nm by each of the second one-half wave plate 71 and the second quarter wave plate 72 in the second phase retardation combined film 7, the retardation amount of light by the liquid crystal layer 3 corresponding to the transmissive region 101 and the retardation amount of light by the liquid crystal layer 3 corresponding to the reflective region 102, the dispersion effect of the one-half wave plates, the quarter wave plates, and the liquid crystal cell can be reduced, the linear-circular polarization conversion efficiency of the transflective display module for the whole incident light can be improved, and the light leakage in the dark state can be reduced, thereby improving the light effect of the reflection and transmission of the transflective display module, and realizing the high brightness and the high contrast of the display module.

In some embodiments, referring to FIG. 1, the display module further includes a scattering film 11 located between the second quarter wave plate 72 and the second substrate 2. The scattering film 11 is used for reducing the specular reflection of the incident light and the emergent light, so that the incident light and the emergent light are subjected to a diffuse reflection, thereby increasing a visual angle of the display module.

In some embodiments, referring to FIG. 3b, the second polarizing film 6, the second one-half wave plate 71, the second quarter wave plate 72 and the scattering film 11 are adhered together by the light-transmitting adhesive 8 to have a one-piece structure.

In some embodiments, referring to FIG. 3a, the display module further includes a brightness enhancement film 18 located on a side of the first polarizing film 4 away from the first one-half wave plate 51, where the brightness enhancement film 18 may enhance a brightness of a backlight provided by a backlight module.

In some embodiments, the brightness enhancement film 18, the first polarizing film 4, the first one-half wave plate 51 and the first quarter wave plate 52 are adhered together by the light-transmitting adhesive 8 to have a one-piece structure.

In some embodiments, referring to FIG. 1, the first substrate 1 includes a first base 12, a pixel circuit 13, a planarization layer 14, a reflective layer 15, and a pixel electrode 16; the pixel circuit 13, the planarization layer 14, the reflective layer 15 and the pixel electrode 16 are sequentially stacked on a side of the first base 12 close to the liquid crystal layer 3; an orthographic projection of the planarization layer 14 on the first base 12 does not overlap with an orthographic projection of the transmissive region 101 on the first base 12; an orthographic projection of the reflective layer 15 on the first base 12 does not overlap with the orthographic projection of the transmissive region 101 on the first base 12; an orthographic projection of the pixel electrode 16 on the first base 12 covers an orthographic projection of each sub-pixel region 100 on the first base 12; the pixel electrode 16 is electrically connected to the pixel circuit 13. Without the planarization layer 14 and the reflective layer 15 in the transmissive region 101, it can be achieved that portions of the liquid crystal layer 3 in the transmissive region 101 and the reflective region 102 have different thicknesses, and thus the retardation amounts of light by the portions of the liquid crystal layer 3 in the transmissive region 101 and the reflective region 102 are different.

The reflective layer 15 is made of a reflective metal material. The planarization layer 14 is made of an organic resin material, and a thickness of the organic resin material may be made greater, which is beneficial to realizing the difference between the thicknesses of the portions of the liquid crystal layer 3 in the transmissive region 101 and the reflective region 102. The pixel circuit 13 is a pixel electrode driving circuit composed of a plurality of thin film transistors and capacitors, for example, the pixel circuit 13 may be a conventional driving circuit such as 2T1C, 3T1C, 4T1C, 5T1C, 6T1C, and 7T1C. The pixel electrode 16 is made of a light-transmitting conductive material, such as an indium tin oxide material; the pixel electrode 16 is connected to a drain electrode of a thin film transistor through a via formed in an insulating layer (e.g., a gate insulating layer, a passivation layer, etc.) in the pixel circuit 13.

In some embodiments, referring to FIG. 1, the second substrate 2 includes a second base 21 and a common electrode 22; the common electrode 22 is positioned on a side of the second base 21 close to the liquid crystal layer 3; the common electrode 22 is a planar electrode, and an orthographic projection of the common electrode 22 on the first base 12 at least covers the orthographic projection of each sub-pixel region 100 on the first base 12. An electric field formed by applying voltages to the common electrode 22 and the pixel electrode 16 controls the liquid crystal molecules of the liquid crystal layer 3 to rotate, thereby realizing transflective display of the display module.

In some embodiments, the display module further includes a backlight module 17 located on a side of the first substrate 1 away from the second substrate 2, and an orthographic projection of the backlight module 17 on the first substrate 1 is at least located in the transmissive region 101, and the backlight module 17 is configured to provide backlight for display in the transmissive region 101. Since the reflective region 101 cannot allow light to pass through the reflective region 101, the backlight module 17 may be disposed only in the transmissive region 101; alternatively, the backlight module 17 only provides backlight to a region corresponding to the transmissive region 101, and the backlight module 17 does not provide backlight to a region corresponding to the reflective region 102.

The backlight module 17 includes a backlight source, which may be a direct-type backlight source or a side-light type backlight source.

In some embodiments, the liquid crystal layer 3 employs an electrically controlled birefringence type liquid crystal (i.e., an ECB type liquid crystal). An angle between a long axis of a liquid crystal molecule and the electric field changes with a voltage, so that a birefringence of the liquid crystal cell changes. The display module adopting the electrically controlled birefringence type liquid crystal can realize the display in a normally white mode; that is, when the electrically controlled birefringence type liquid crystal is not powered up, long axes of the liquid crystal molecules are arranged in a nematic way parallel to the first substrate 1, and the display module displays a white state; when the electrically controlled birefringence type liquid crystal is powered up, the long axes of the liquid crystal molecules are arranged in a nematic way perpendicular to the first substrate 1, and the display module displays a black state.

Figure 17:
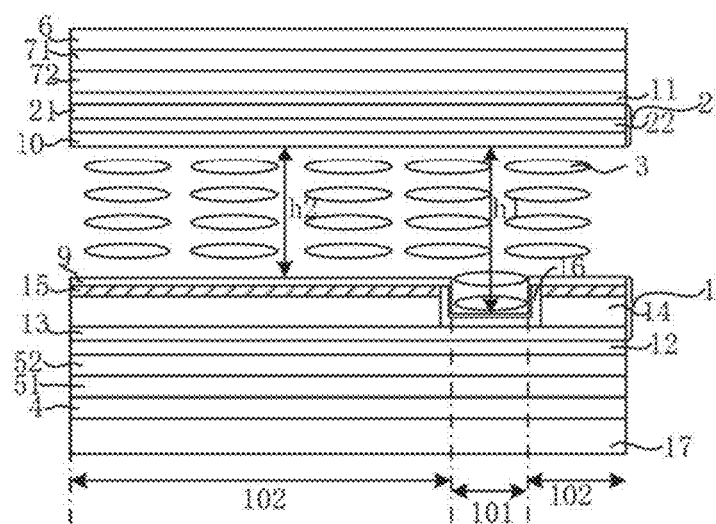
FIG. 17 is a cross-sectional view of another structure of a display module according to embodiments of the present disclosure.

In some embodiments, referring to FIG. 17, the first substrate 1 includes a first base 12, a pixel circuit 13, a planarization layer 14, a reflective layer 15, and a pixel electrode 16; the pixel circuit 13, the planarization layer 14 and the reflective layer 15 are sequentially stacked on a side of the first base 12 close to the liquid crystal layer 3; an orthographic projection of the planarization layer 14 on the first base 12 does not overlap with an orthographic projection of the transmissive region 101 on the first base 12; an orthographic projection of the reflective layer 15 on the first base 12 does not overlap with the orthographic projection of the transmissive region 101 on the first base 12; an orthographic projection of the pixel electrode 16 on the first base 12 does not overlap with an orthographic projection of the reflective region 102 on the first base 12; the pixel electrode 16 is connected to the reflective layer 15 in a lap joint manner; the pixel electrode 16 or the reflective layer 15 is electrically connected to the pixel circuit 13.

Referring to FIG. 17, the pixel electrode 16 is disposed only in the transmissive region 101, the reflective layer 15 is disposed only in the reflective region 102; and on the one hand, the reflective layer 15 in the reflective region 102 reflects incident light to realize the reflective display in the reflective region 102; on the other hand, the reflective layer 15 also serves as the pixel electrode in the reflective region 102, and the reflective layer 15 and the pixel electrode 16 are connected together in a lap joint manner and collectively serve as the pixel electrode, thereby realizing image display of each sub-pixel region.

Figure 18:
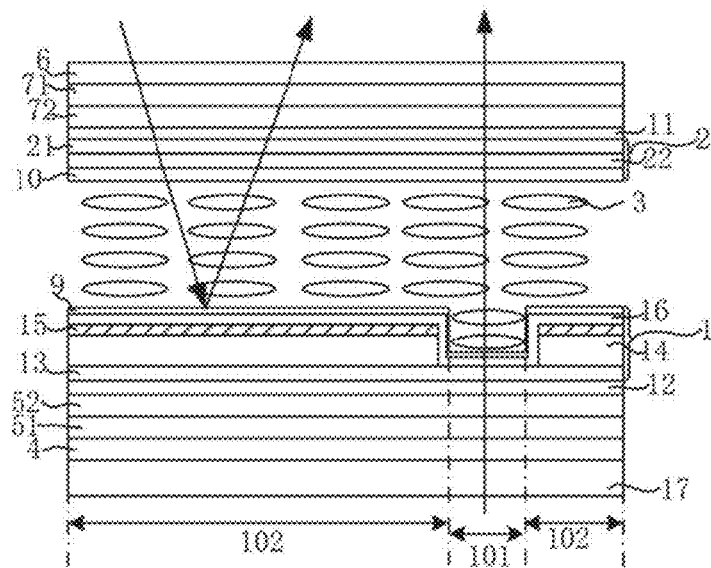
FIG. 18 is a schematic diagram of a light path of a display module shown in FIG. 1 in a white state.
Figure 19:
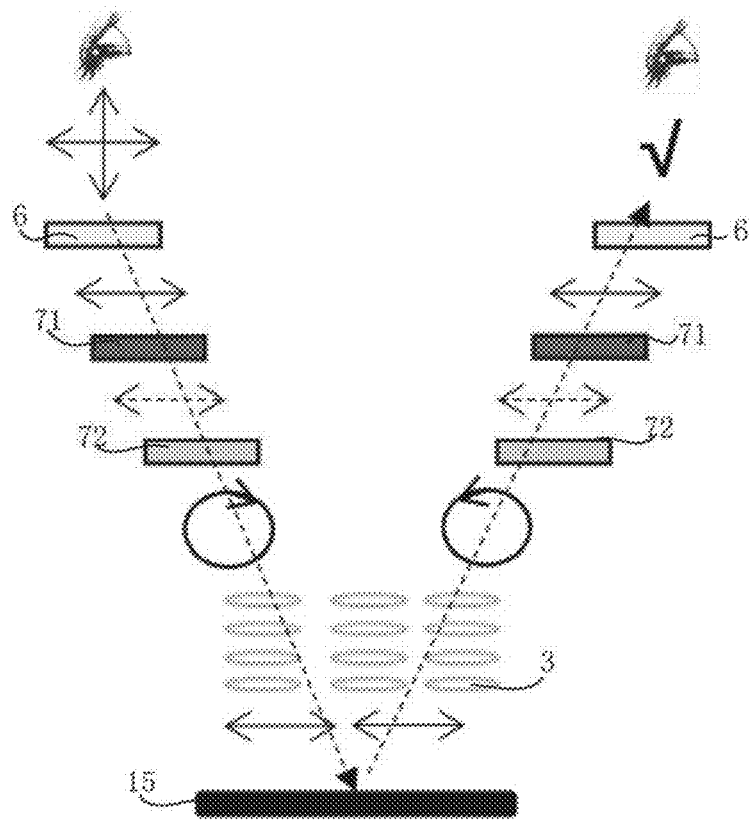
FIG. 19 is a schematic diagram illustrating a polarization conversion of light in a reflective region of a display module of FIG. 1 in a white state.
Figure 20:
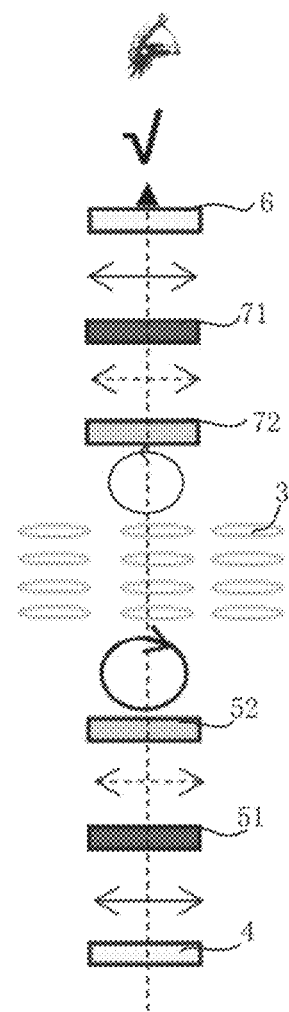
FIG. 20 is a schematic diagram illustrating a polarization conversion of light in a transmissive region of a display module of FIG. 1 in a white state.

In this embodiment, the display module with the above structure can display the white state when no electric field is formed between the pixel electrode 16 and the common electrode 22 without powering up; a light path of the display module in the white state is shown in FIG. 18, FIG. 19 and FIG. 20; in the reflective region 102, the external ambient light is converted into the linearly polarized light in a first polarization direction after passing through the second polarizing film 6; the linearly polarized light in the first polarization direction is still the linearly polarized light after passing through the second one-half wave plate 71, but a phase of the linearly polarized light is compensated for a certain angle, that is, a polarization angle of the linearly polarized light without passing through the second one-half wave plate 71 and a polarization angle of the linearly polarized light passing through the second one-half wave plate 71 are mirror symmetric angles. The linearly polarized light subjected to the phase compensation is converted into circularly polarized light in the clockwise direction after passing through the second quarter wave plate 72; the circularly polarized light is converted into the linearly polarized light in the first polarization direction after passing through the liquid crystal layer 3 with long axes arranged in a nematic way parallel to the first substrate 1; the linearly polarized light in the first polarization direction is still the linearly polarized light in the first polarization direction after being reflected by the reflective layer 15 in the reflective region 102, that is, the polarization direction of the linearly polarized light is not changed; the reflected linearly polarized light in the first polarization direction is converted into circularly polarized light in a counterclockwise direction after passing through the liquid crystal layer 3 with long axes arranged in a nematic way parallel to the first substrate 1; the circularly polarized light is converted into the linearly polarized light in the first polarization direction after passing through the second quarter wave plate 72; the linearly polarized light in the first polarization direction is subjected to the phase compensation after passing through the second one-half wave plate 71, and is still the linearly polarized light; the linearly polarized light is emitted after passing through the second polarizing film 6, and the display of the reflective region 102 in the white state is realized. In the transmissive region 101, the backlight provided by the backlight module 17 passes through the first polarizing film 4 and is converted into the linearly polarized light in the first polarization direction; the linearly polarized light in the first polarization direction is subjected to the phase compensation after passing through the first one-half wave plate 51, but is still the linearly polarized light; the linearly polarized light is converted into the circularly polarized light in the clockwise direction after passing through the first quarter wave plate 52; the circularly polarized light in the clockwise direction is converted into the circularly polarized light in the counterclockwise direction after passing through the liquid crystal layer 3 with long axes arranged in a nematic way parallel to the first substrate 1; the circularly polarized light in the counterclockwise direction is converted into the linearly polarized light in the first polarization direction after passing through the second quarter wave plate 72; the linearly polarized light in the first polarization direction is subjected to the phase compensation after passing through the second one-half wave plate 71, but is still the linearly polarized light; the linearly polarized light is emitted after passing through the second polarizing film 6, and the display of the transmissive region 101 in the white state is realized.

Figure 21:
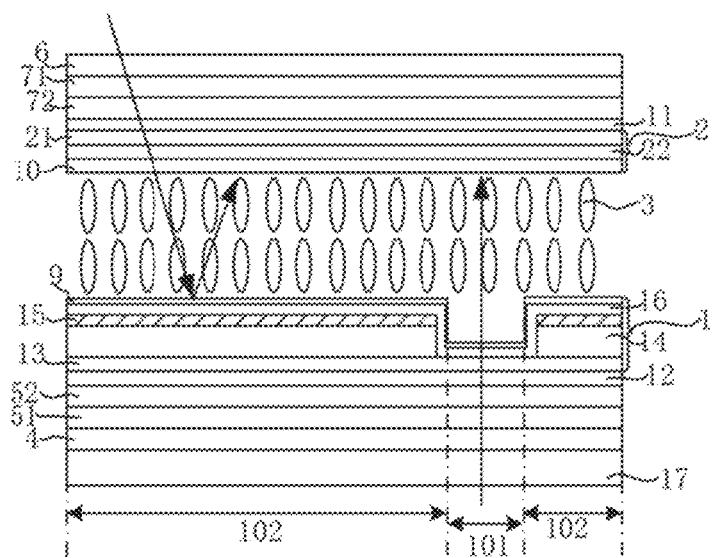
FIG. 21 is a schematic diagram of a light path of a display module shown in FIG. 1 in a black state.
Figure 22:
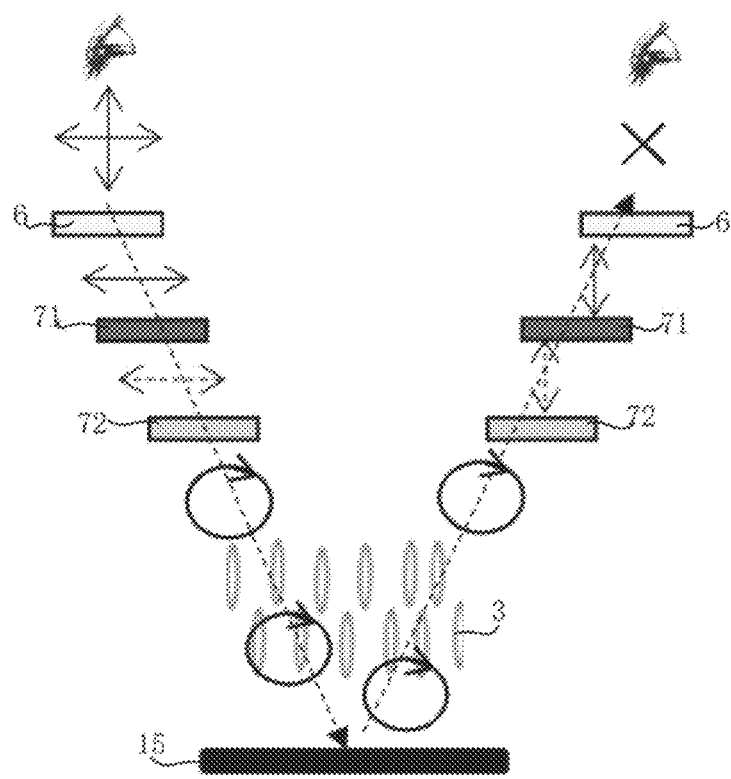
FIG. 22 is a schematic diagram illustrating a polarization conversion of light in a reflective region of a display module of FIG. 1 in a black state.
Figure 23:
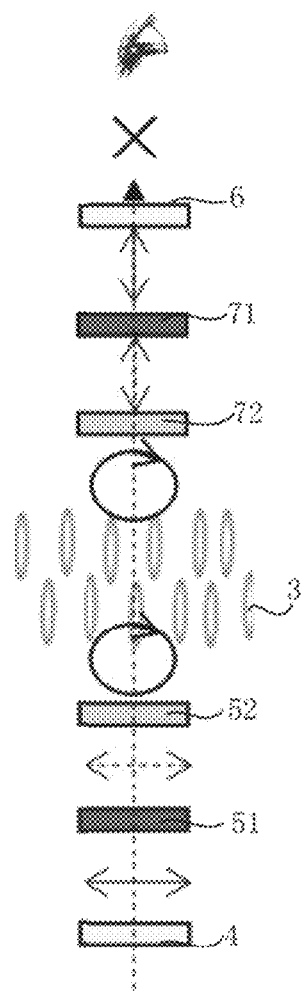
FIG. 23 is a schematic diagram illustrating a polarization conversion of light in a transmissive region of a display module of FIG. 1 in a black state.

In this embodiment, the display module with the above structure displays a black state when an electric field is formed between the pixel electrode 16 and the common electrode 22 with powering up. The light path of the display module in the black state is shown in FIGS. 21, 22 and 23; in the reflective region 102, the external ambient light is converted into the linearly polarized light in the first polarization direction after passing through the second polarizing film 6; the linearly polarized light in the first polarization direction is still the linearly polarized light after passing through the second one-half wave plate 71, but a phase of the linearly polarized light is compensated for a certain angle, that is, the polarization angle of the linearly polarized light without passing through the second one-half wave plate 71 and the polarization angle of the linearly polarized light passing through the second one-half wave plate 71 are mirror symmetric angles. The linearly polarized light subjected to the phase compensation is converted into circularly polarized light in the clockwise direction after passing through the second quarter wave plate 72; the circularly polarized light is still the circularly polarized light in the clockwise direction after passing through the liquid crystal layer 3 with long axes arranged in a nematic way perpendicular to the first substrate 1; the circularly polarized light in the clockwise direction is still circularly polarized light in the clockwise direction after being reflected by the reflective layer 15 in the reflective region 102, that is, the polarization direction of the circularly polarized light in the clockwise direction is not changed; the reflected circularly polarized light in the clockwise direction is still the circularly polarized light in the clockwise direction after passing through the liquid crystal layer 3 with long axes arranged in a nematic way perpendicular to the first substrate 1; the circularly polarized light is converted into linearly polarized light in a second polarization direction after passing through the second quarter wave plate 72; the linearly polarized light in the second polarization direction is subjected to the phase compensation after passing through the second one-half wave plate 71, and is still the linearly polarized light in the second polarization direction; the linearly polarized light cannot be emitted after passing through the second polarizing film 6, and thus, the display of the reflective region 102 in the black state is realized. In the transmissive region 101, the backlight provided by the backlight module 17 passes through the first polarizing film 4 and is converted into the linearly polarized light in the first polarization direction; the linearly polarized light in the first polarization direction is subjected to the phase compensation after passing through the first one-half wave plate 51, but is still the linearly polarized light in the first polarization direction; the linearly polarized light is converted into the circularly polarized light in the clockwise direction after passing through the first quarter wave plate 52; the circularly polarized light in the clockwise direction is still the circularly polarized light in the clockwise direction after passing through the liquid crystal layer 3 with long axes arranged in a nematic way perpendicular to the first substrate 1; the circularly polarized light in the clockwise direction is converted into the linearly polarized light in the second polarization direction after passing through the second quarter wave plate 72; the linearly polarized light in the second polarization direction is subjected to the phase compensation after passing through the second one-half wave plate 71, but is still the linearly polarized light in the second polarization direction; the linearly polarized light cannot be emitted after passing through the second polarizing film 6, and thus, the display of the transmissive region 101 in the black state is realized.

In the display module provided in the embodiments of the present disclosure, through the above combining and matching design in the display module on the direction of the absorption axis of each of the first polarizing film 4 and the second polarizing film 6, the direction of the slow axis of each of the first one-half wave plate 51 and the first quarter wave plate 52 and the retardation amount of light with wavelength of 550 nm by each of the first one-half wave plate 51 and the first quarter wave plate 52, the direction of the slow axis of each of the second one-half wave plate 71 and the second quarter wave plate 72 and the retardation amount of light with wavelength of 550 nm by each of the second one-half wave plate 71 and the second quarter wave plate 72, the retardation amount of light by the liquid crystal layer 3 corresponding to the transmissive region 101 and the retardation amount of light by the liquid crystal layer 3 corresponding to the reflective region 102, the dispersion effect of the one-half wave plates, the quarter wave plates, and the liquid crystal cell can be reduced, the linear-circular polarization conversion efficiency of the transflective display module for the whole incident light can be improved, and the light leakage in the dark state can be reduced, thereby improving the light effect of the reflection and transmission of the transflective display module, and realizing the high brightness and the high contrast of the display module.

Aiming at the problems of low brightness, low contrast, color shift and the like of the transflective liquid crystal display module in the prior art, the embodiments of the present disclosure further provide a display module, which includes: a first substrate; a second substrate; a liquid crystal layer in a cell gap between the first substrate and the second substrate; the liquid crystal layer adopts the electrically controlled birefringence type liquid crystal; the display module further includes a first polarizing film, a first one-half wave plate and a first quarter wave plate; the first quarter wave plate, the first one-half wave plate and the first polarizing film are positioned on a side of the first substrate away from the liquid crystal layer and are sequentially stacked in a direction away from the first substrate; the display module further includes a second polarizing film, a second one-half wave plate and a second quarter wave plate; the second quarter wave plate, the second one-half wave plate and the second polarizing film are positioned on a side of the second substrate away from the liquid crystal layer and are sequentially stacked in a direction away from the second substrate; the first substrate includes a transmissive region and a reflective region, and a thickness of the liquid crystal layer in the transmissive region is greater than a thickness of the liquid crystal layer in the reflective region; the transmissive region allows light incident from a side of the first substrate away from the second substrate to pass through the transmissive region; the reflective region allows light incident from a side of the second substrate away from the first substrate to be reflected; an angle between an absorption axis of the first polarizing film and a first direction is in a range of 85° to 105°; an angle between a slow axis of the first one-half wave plate and the first direction is in a range of 105° to 125°; a retardation amount of light with wavelength of 550 nm by the first one-half wave plate is in a range of 260 nm to 280 nm; an angle between a slow axis of the first quarter wave plate and the first direction is in a range of −20° to 20°; a retardation amount of light with wavelength of 550 nm by the first quarter wave plate is in a range of 136 nm to 170 nm; an angle between an absorption axis of the second polarizing film and the first direction is in a range of 0° to 10°; an angle between a slow axis of the second one-half wave plate and the first direction is in a range of 20° to 30°; a retardation amount of light with wavelength of 550 nm by the second one-half wave plate is in a range of 260 nm to 280 nm; an angle between a slow axis of the second quarter wave plate and the first direction is in a range of 80° to 100°; a retardation amount of light with wavelength of 550 nm by the second quarter wave plate is in a range of 80 nm to 115 nm; a retardation amount of light by the liquid crystal layer corresponding to the transmissive region is in a range of 228 nm to 402 nm; a retardation amount of light by the liquid crystal layer corresponding to the reflective region is in a range of 101 nm to 214 nm; the first direction is a direction perpendicular to an initial alignment direction of the liquid crystal layer.

In some embodiments, the angle between the absorption axis of the first polarizing film and the first direction is in a range of 90° to 100°; the angle between the slow axis of the first one-half wave plate and the first direction is in a range of 110° to 120°; the angle between the slow axis of the first quarter wave plate and the first direction is in a range of −10° to 10°; the retardation amount of light with wavelength of 550 nm by the first quarter wave plate is in a range of 138 nm to 170 nm.

In some embodiments, the angle between the slow axis of the second one-half wave plate and the first direction is in a range of 24° to 27°; the angle between the slow axis of the second quarter wave plate and the first direction is in a range of 88° to 94°.

In some embodiments, the angle between the absorption axis of the first polarizing film and the first direction is 95°; the angle between the slow axis of the first one-half wave plate and the first direction is 115°; the retardation amount of light with wavelength of 550 nm by the first one-half wave plate is 270 nm; the angle between the slow axis of the first quarter wave plate and the first direction is 0°; the retardation amount of light with wavelength of 550 nm by the first quarter wave plate is 158 nm.

In some embodiments, the angle between the absorption axis of the second polarizing film and the first direction is 5°; the angle between the slow axis of the second one-half wave plate and the first direction is 25°; the retardation amount of light with wavelength of 550 nm by the second one-half wave plate is 270 nm; the angle between the slow axis of the second quarter wave plate and the first direction is 90°; the retardation amount of light with wavelength of 550 nm by the second quarter wave plate is 110 nm.

In some embodiments, the retardation amount of light by the liquid crystal layer corresponding to the transmissive region is in a range of 241 nm to 402 nm; the retardation amount of light by the liquid crystal layer corresponding to the reflective region is in a range of 121 nm to 201 nm.

In the display module provided by the embodiments of the present disclosure, through the above combining and matching design in the display module on the direction of the absorption axis of each of the first polarizing film and the second polarizing film, the direction of the slow axis of each of the first one-half wave plate and the first quarter wave plate and the retardation amount of light with wavelength of 550 nm by each of the first one-half wave plate and the first quarter wave plate, the direction of the slow axis of each of the second one-half wave plate and the second quarter wave plate and the retardation amount of light with wavelength of 550 nm by each of the second one-half wave plate and the second quarter wave plate, the retardation amount of light by the liquid crystal layer corresponding to the transmissive region and the retardation amount of light by the liquid crystal layer corresponding to the reflective region, the dispersion effect of the one-half wave plates, the quarter wave plates, and the liquid crystal cell can be reduced, the linear-circular polarization conversion efficiency of the transflective display module for the whole incident light can be improved, and the light leakage in the dark state can be reduced, thereby improving the light effect of the reflection and transmission of the transflective display module, and realizing the high brightness and the high contrast of the display module.

The embodiments of the present disclosure further provide a display apparatus, which includes the display module in the above embodiments.

In the display apparatus provided in embodiments of the present disclosure, by adopting the display module in embodiments of the present disclosure, the light effect of the reflection and transmission of the display apparatus can be improved, and the brightness and the contrast of the display apparatus can be improved.

The embodiments of the present disclosure further provide a display method for the display apparatus, including: causing the light incident from a side of the first substrate away from the second substrate to pass through the transmissive region for display in a transmission mode; causing the light incident from a side of the second substrate away from the first substrate to be reflected by the reflective region for display in a reflective mode; the display method further includes: detecting a brightness of the ambient light; adjusting a display brightness of the transmissive region according to the brightness of the ambient light; wherein the display brightness of the transmissive region is inversely proportional to the brightness of the ambient light. The actual adjustment process is: reducing a backlight brightness of the transmissive region so as to close the backlight source when the brightness of the ambient light is higher; improving the backlight brightness of the transmissive region when the brightness of the ambient light is low.

The display apparatus provided by the embodiments of the present disclosure may be any product or component with a display function, such as an LCD panel, an LCD television, a display, a mobile phone, a navigator or the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display module, comprising: a first substrate; a second substrate; a liquid crystal layer in a cell gap between the first substrate and the second substrate; wherein the display module further comprises a first polarizing film, a first one-half wave plate and a first quarter wave plate; the first quarter wave plate, the first one-half wave plate and the first polarizing film are on a side of the first substrate away from the liquid crystal layer and are sequentially stacked in a direction away from the first substrate;

the first substrate comprises a transmissive region and a reflective region, and a thickness of a part of the liquid crystal layer in the transmissive region is greater than a thickness of a part of the liquid crystal layer in the reflective region;

the transmissive region allows light incident from a side of the first substrate away from the second substrate to pass through the transmissive region; the reflective region allows light incident from a side of the second substrate away from the first substrate to be reflected;

an angle between an absorption axis of the first polarizing film and a first direction is in a range of 85° to 105°;

an angle between a slow axis of the first one-half wave plate and the first direction is in a range of 105° to 125°;

a retardation amount of light with wavelength of 550 nm by the first one-half wave plate is in a range of 260 nm to 280 nm;

an angle between a slow axis of the first quarter wave plate and the first direction is in a range of −20° to 20°;

a retardation amount of light with wavelength of 550 nm by the first quarter wave plate is in a range of 136 nm to 170 nm; and the first direction is a direction perpendicular to an initial alignment direction of the liquid crystal layer.

2. The display module according to claim 1, further comprising a second polarizing film, a second one-half wave plate and a second quarter wave plate; wherein the second quarter wave plate, the second one-half wave plate and the second polarizing film are on a side of the second substrate away from the liquid crystal layer and are sequentially stacked in a direction away from the second substrate;

an angle between an absorption axis of the second polarizing film and the first direction is in a range of 0° to 10°;

an angle between a slow axis of the second one-half wave plate and the first direction is in a range of 20° to 30°;

a retardation amount of light with wavelength of 550 nm by the second one-half wave plate is in a range of 260 nm to 280 nm;

an angle between a slow axis of the second quarter wave plate and the first direction is in a range of 80° to 100°; and a retardation amount of light with wavelength of 550 nm by the second quarter wave plate is in a range of 80 nm to 115 nm.

3. The display module according to claim 2, wherein the angle between the absorption axis of the first polarizing film and the first direction is in a range of 90° to 100°;

the angle between the slow axis of the first one-half wave plate and the first direction is in a range of 110° to 120°;

the angle between the slow axis of the first quarter wave plate and the first direction is in a range of −10° to 10°; and the retardation amount of light with wavelength of 550 nm by the first quarter wave plate is in a range of 138 nm to 170 nm.

4. The display module according to claim 3, wherein the angle between the slow axis of the second one-half wave plate and the first direction is in a range of 24° to 27°; and the angle between the slow axis of the second quarter wave plate and the first direction is in a range of 88° to 94°.

5. The display module according to claim 4, wherein a retardation amount of light by the part of the liquid crystal layer in the transmissive region is in a range of 228 nm to 402 nm; and a retardation amount of light by the part of the liquid crystal layer in the reflective region is in a range of 101 nm to 214 nm.

6. The display module according to claim 5, wherein the retardation amount of light by the part of the liquid crystal layer in the transmissive region is in a range of 241 nm to 402 nm; and the retardation amount of light by the part of the liquid crystal layer in the reflective region is in a range of 121 nm to 201 nm.

7. The display module according to claim 6, further comprising a first alignment film and a second alignment film;

wherein the first alignment film is on a side of the first substrate close to the liquid crystal layer;

the second alignment film is on a side of the second substrate close to the liquid crystal layer;

the first alignment film and the second alignment film are configured such that the liquid crystal layer is in the initial alignment direction without powering up;

alignment directions of the first alignment film and the second alignment film are parallel and opposite to each other; and the first direction is perpendicular to the alignment directions of the first alignment film and the second alignment film.

8. The display module according to claim 2, further comprising a scattering film between the second quarter wave plate and the second substrate.

9. The display module according to claim 2, wherein the first polarizing film comprises a first protective layer, a first polarizer, and a second protective layer;

the first protective layer, the first polarizer, and the second protective layer are sequentially stacked together;

the second polarizing film comprises a third protective layer, a second polarizer, and a fourth protective layer;

the third protective layer, the second polarizer, and the fourth protective layer are sequentially stacked together;

the first polarizing film, the first one-half wave plate and the first quarter wave plate are adhered together by a light-transmitting adhesive; and the second polarizing film, the second one-half wave plate and the second quarter wave plate are adhered together by a light-transmitting adhesive.

10. The display module according to claim 1, wherein the first substrate comprises a plurality of sub-pixel regions arranged in an array; and each of the plurality of sub-pixel regions is divided into the transmissive region and the reflective region.

11. The display module according to claim 10, wherein the first substrate comprises a first base, a pixel circuit, a planarization layer, a reflective layer, and a pixel electrode;

the pixel circuit, the planarization layer, the reflective layer and the pixel electrode are sequentially stacked on a side of the first base close to the liquid crystal layer;

an orthographic projection of the planarization layer on the first base does not overlap with the transmissive region;

an orthographic projection of the reflective layer on the first base does not overlap with the transmissive region;

an orthographic projection of the pixel electrode on the first base covers an orthographic projection of the sub-pixel region on the first base; and the pixel electrode is electrically connected to the pixel circuit.

12. The display module according to claim 10, wherein the first substrate comprises a first base, a pixel circuit, a planarization layer, a reflective layer, and a pixel electrode;

the pixel circuit, the planarization layer and the reflective layer are sequentially stacked on a side of the first base close to the liquid crystal layer;

an orthographic projection of the planarization layer on the first base does not overlap with the transmissive region;

an orthographic projection of the reflective layer on the first base does not overlap with the transmissive region;

an orthographic projection of the pixel electrode on the first base does not overlap with the reflective region;

the pixel electrode is lapped over the reflective layer; and the pixel electrode or the reflective layer is electrically connected to the pixel circuit.

13. The display module according to claim 10, wherein the second substrate comprises a second base and a common electrode;

the common electrode is on a side of the second base close to the liquid crystal layer; and the common electrode is a planar electrode, and an orthographic projection of the common electrode on the first base at least covers an orthographic projection of each sub-pixel region on the first base.

14. The display module according to claim 1, further comprising a backlight module on a side of the first substrate away from the second substrate; wherein an orthographic projection of the backlight module on the first substrate is at least located in the transmissive region, and the backlight module is configured to provide backlight for display in the transmissive region.

15. A display apparatus, comprising the display module according to claim 1.

16. A display method for the display apparatus according to claim 15, comprising: causing light incident from a side of the first substrate away from the second substrate to pass through the transmissive region for display in a transmission mode; and causing light incident from a side of the second substrate away from the first substrate to be reflected in the reflective region for display in a reflective mode;

wherein the display method further comprises:

detecting a brightness of ambient light; and adjusting a display brightness in the transmissive region according to the brightness of the ambient light;

wherein the display brightness in the transmissive region is inversely proportional to the brightness of the ambient light.

17. A display module, comprising: a first substrate; a second substrate; a liquid crystal layer in a cell gap between the first substrate and the second substrate; wherein the liquid crystal layer adopts an electrically controlled birefringence type liquid crystal;

the display module further comprises a first polarizing film, a first one-half wave plate and a first quarter wave plate; the first quarter wave plate, the first one-half wave plate and the first polarizing film are on a side of the first substrate away from the liquid crystal layer and are sequentially stacked in a direction away from the first substrate;

the display module further comprises a second polarizing film, a second one-half wave plate and a second quarter wave plate; the second quarter wave plate, the second one-half wave plate and the second polarizing film are on a side of the second substrate away from the liquid crystal layer and are sequentially stacked in a direction away from the second substrate;

the first substrate comprises a transmissive region and a reflective region, and a thickness of a part of the liquid crystal layer in the transmissive region is greater than a thickness of a part of the liquid crystal layer in the reflective region;

the transmissive region allows light incident from a side of the first substrate away from the second substrate to pass through the transmissive region; the reflective region allows light incident from a side of the second substrate away from the first substrate to be reflected;

an angle between an absorption axis of the first polarizing film and a first direction is in a range of 85° to 105°;

an angle between a slow axis of the first one-half wave plate and the first direction is in a range of 105° to 125°;

a retardation amount of light with wavelength of 550 nm by the first one-half wave plate is in a range of 260 nm to 280 nm;

an angle between a slow axis of the first quarter wave plate and the first direction is in a range of −20° to 20°;

a retardation amount of light with wavelength of 550 nm by the first quarter wave plate is in a range of 136 nm to 170 nm;

an angle between an absorption axis of the second polarizing film and the first direction is in a range of 0° to 10°;

an angle between a slow axis of the second one-half wave plate and the first direction is in a range of 20° to 30°;

a retardation amount of light with wavelength of 550 nm by the second one-half wave plate is in a range of 260 nm to 280 nm;

an angle between a slow axis of the second quarter wave plate and the first direction is in a range of 80° to 100°;

a retardation amount of light with wavelength of 550 nm by the second quarter wave plate is in a range of 80 nm to 115 nm;

a retardation amount of light by the part of the liquid crystal layer in the transmissive region is in a range of 228 nm to 402 nm;

a retardation amount of light by the part of the liquid crystal layer in the reflective region is in a range of 101 nm to 214 nm; and the first direction is a direction perpendicular to an initial alignment direction of the liquid crystal layer.

18. The display module according to claim 17, wherein the angle between the absorption axis of the first polarizing film and the first direction is in a range of 90° to 100°;

the angle between the slow axis of the first one-half wave plate and the first direction is in a range of 110° to 120°;

the angle between the slow axis of the first quarter wave plate and the first direction is in a range of −10° to 10°; and the retardation amount of light with wavelength of 550 nm by the first quarter wave plate is in a range of 138 nm to 170 nm.

19. The display module according to claim 18, wherein the angle between the slow axis of the second one-half wave plate and the first direction is in a range of 24° to 27°; and the angle between the slow axis of the second quarter wave plate and the first direction is in a range of 88° to 94°.

20. The display module according to claim 19, wherein the retardation amount of light by the part of the liquid crystal layer in the transmissive region is in a range of 241 nm to 402 nm; and the retardation amount of light by the part of the liquid crystal layer in the reflective region is in a range of 121 nm to 201 nm.

* * * * *